(12) United States Patent
Nojiri

(10) Patent No.: US 7,032,823 B2
(45) Date of Patent: Apr. 25, 2006

(54) TWO-DIMENSIONAL CODE, METHODS AND APPARATUSES FOR GENERATING, DISPLAYING AND READING THE SAME

(75) Inventor: Tadao Nojiri, Oobu (JP)

(73) Assignee: Denso Wave Incorporated, Tokyo (JP)

( * ) Notice: Subject to any disclaimer, the term of this patent is extended or adjusted under 35 U.S.C. 154(b) by 55 days.

(21) Appl. No.: 10/764,542

(22) Filed: Jan. 27, 2004

(65) Prior Publication Data

US 2004/0182930 A1    Sep. 23, 2004

(30) Foreign Application Priority Data

Jan. 30, 2003    (JP) .............................. 2003-021936

(51) Int. Cl.
    *G06K 7/10*    (2006.01)

(52) U.S. Cl. ........................... 235/462.09; 235/462.01; 235/494

(58) Field of Classification Search ..............................
    235/462.01–462.45, 494, 456, 454, 472.01,
    235/472.02, 472.03, 455
    See application file for complete search history.

(56) References Cited

U.S. PATENT DOCUMENTS

| | | | |
|---|---|---|---|
| 5,726,707 A * | 3/1998 | Sakurai et al. ........... | 348/222.1 |
| 6,530,523 B1 * | 3/2003 | Oakeson et al. ....... | 235/462.01 |
| 6,601,772 B1 * | 8/2003 | Rubin et al. ................. | 235/494 |
| 6,629,635 B1 * | 10/2003 | Akamine ..................... | 235/375 |
| 2003/0001013 A1 * | 1/2003 | Akamine ..................... | 235/454 |
| 2003/0121978 A1 * | 7/2003 | Rubin et al. ............. | 235/462.1 |
| 2004/0020989 A1 * | 2/2004 | Muramatsu ............... | 235/462.1 |
| 2004/0262393 A1 * | 12/2004 | Hara et al. ............. | 235/462.14 |
| 2005/0001033 A1 * | 1/2005 | Cheong et al. ............. | 235/454 |

FOREIGN PATENT DOCUMENTS

| | | |
|---|---|---|
| JP | 10-283446 | 10/1998 |
| JP | 2000-6191 | 3/2000 |

* cited by examiner

*Primary Examiner*—Thien M. Le
(74) *Attorney, Agent, or Firm*—Posz Law Group, PLC

(57) ABSTRACT

In a two-dimensional code, a plurality of unit cells are arranged in two-dimension. Each of the unit cells indicates one of at least three colors, such as, "white", "black", "red", "blue", and "green". Each color of each of the unit cells is optically readable and represents a data value set to each of the unit cells. In the two-dimensional code, a specifying pattern portion is provided. The specifying pattern portion includes a plurality of color reference cells and is configured to specify positions of the unit cells. The color reference cells indicates all of the at least three colors.

24 Claims, 18 Drawing Sheets

FIG. 1A
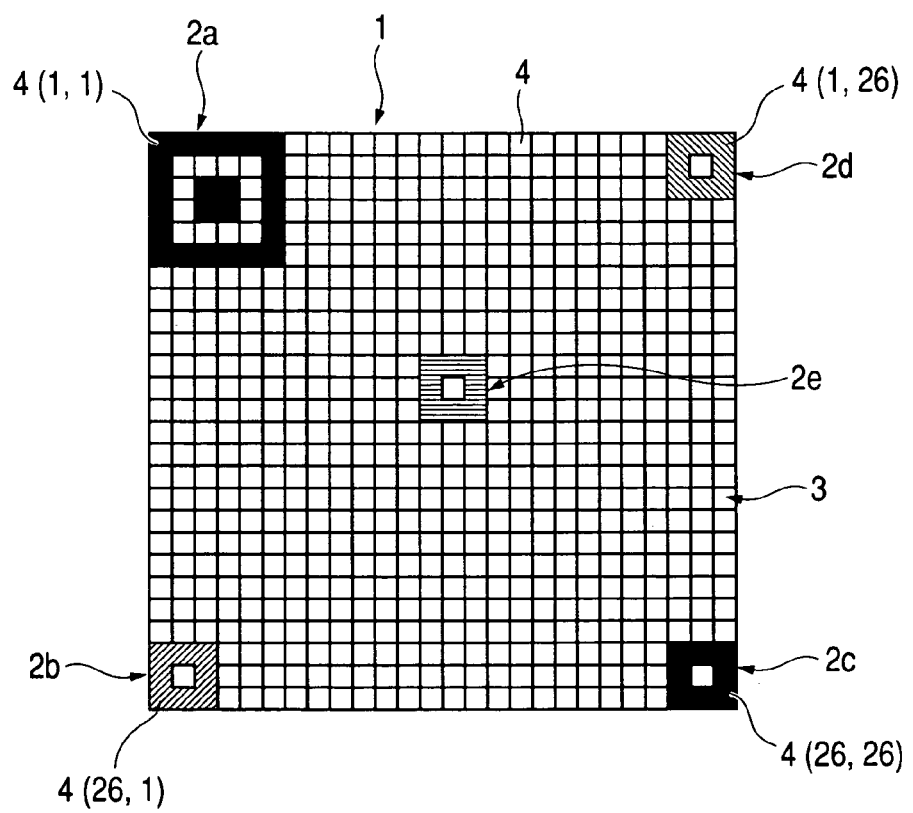
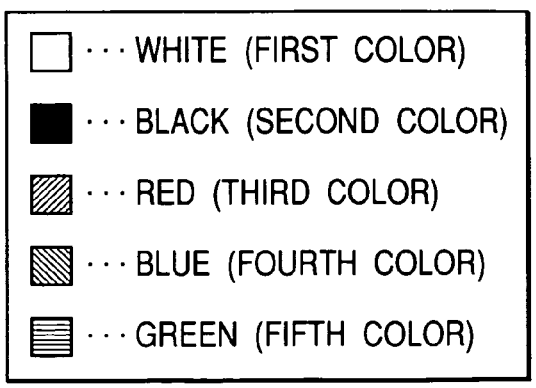

FIG. 2A
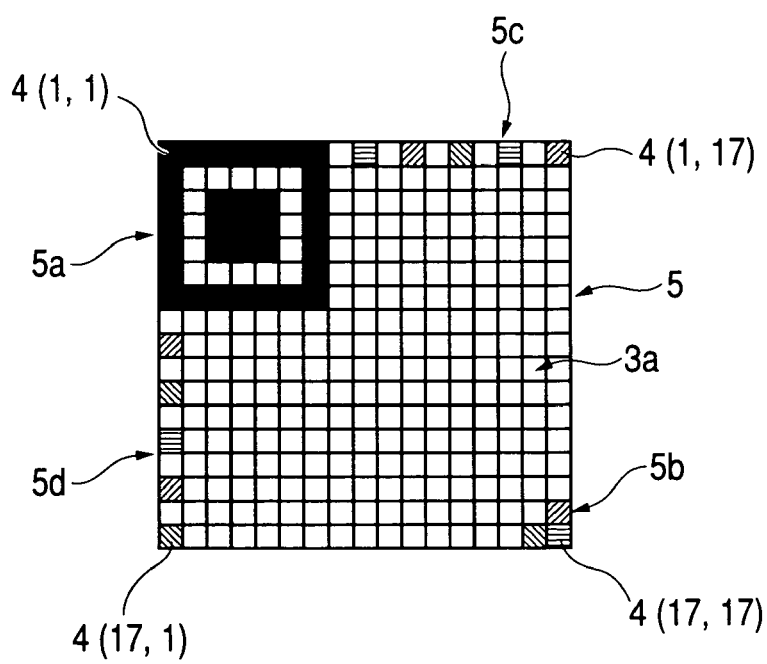
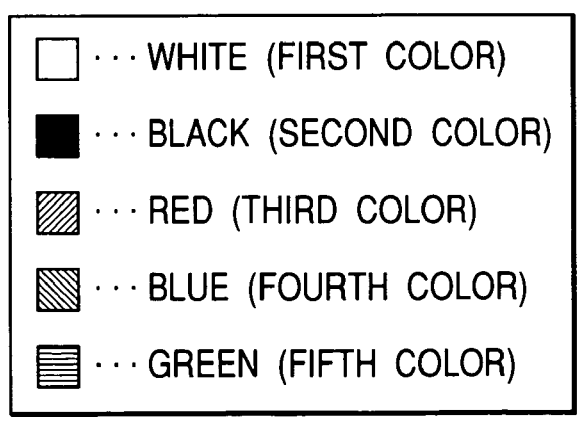

FIG. 2B
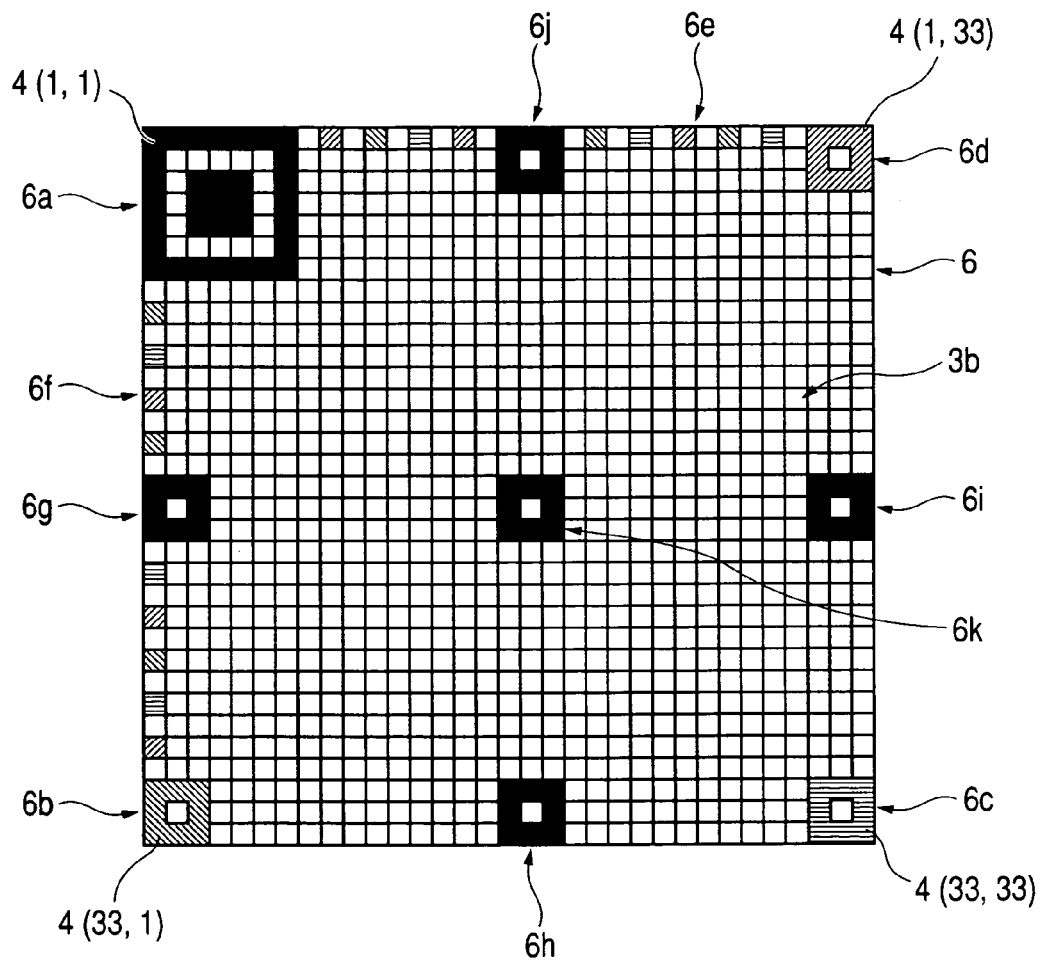
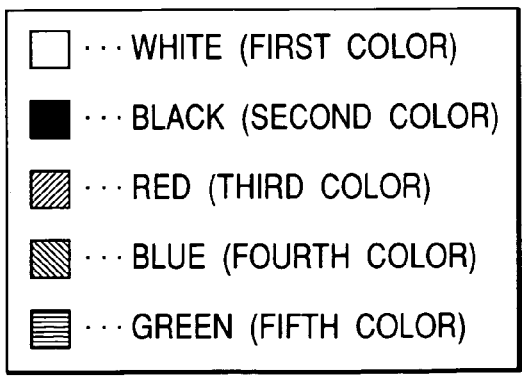

FIG. 2C
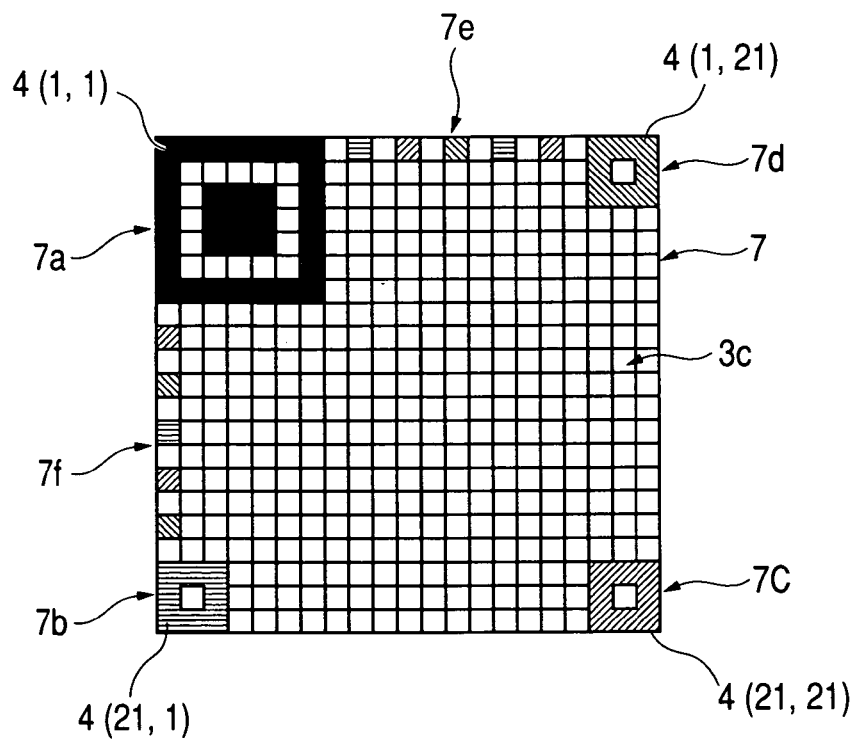
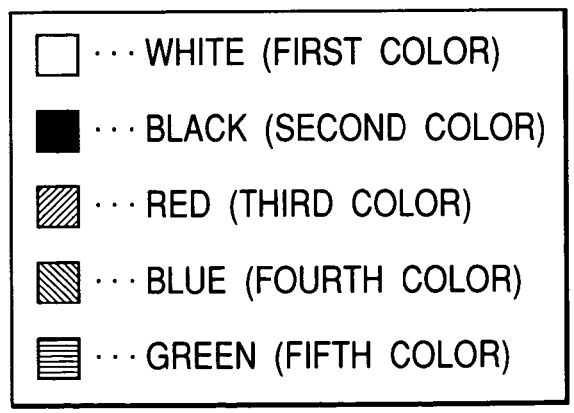
☐ ··· WHITE (FIRST COLOR)
■ ··· BLACK (SECOND COLOR)
▨ ··· RED (THIRD COLOR)
▨ ··· BLUE (FOURTH COLOR)
▤ ··· GREEN (FIFTH COLOR)

FIG. 4A

DATA VALUE "0"
DATA (0, 0, 0, 0, 0, 0, 0, 0, 0)

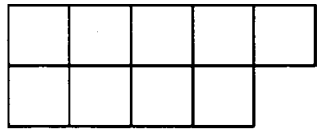

☐ ··· WHITE (FIRST COLOR) → DATA 0
■ ··· BLACK (SECOND COLOR) → DATA 4
▨ ··· RED (THIRD COLOR) → DATA 1
▧ ··· BLUE (FOURTH COLOR) → DATA 3
▤ ··· GREEN (FIFTH COLOR) → DATA 2

FIG. 4B

DATA (0, 0, 0, 0)
COLOR

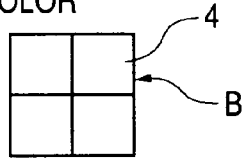

☐ ··· WHITE (FIRST COLOR) → DATA 0
■ ··· BLACK (SECOND COLOR) → DATA 4
▨ ··· RED (THIRD COLOR) → DATA 1
▧ ··· BLUE (FOURTH COLOR) → DATA 3
▤ ··· GREEN (FIFTH COLOR) → DATA 2

FIG. 4C

DATA (1, 2, 3, 0)

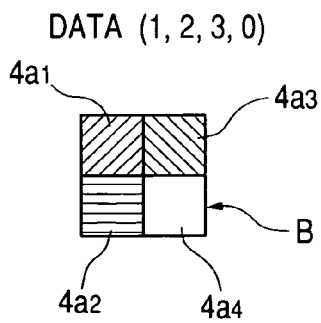

☐ ··· WHITE (FIRST COLOR) → DATA 0
■ ··· BLACK (SECOND COLOR) → DATA 4
▨ ··· RED (THIRD COLOR) → DATA 1
▧ ··· BLUE (FOURTH COLOR) → DATA 3
▤ ··· GREEN (FIFTH COLOR) → DATA 2

FIG. 4D

DATA (1, 1, 1, 1, 1, 1, 1, 1, 0)

- □ ··· WHITE (FIRST COLOR) → DATA 0
- ■ ··· BLACK (SECOND COLOR) → DATA 4
- ▨ ··· RED (THIRD COLOR) → DATA 1
- ▨ ··· BLUE (FOURTH COLOR) → DATA 3
- ▤ ··· GREEN (FIFTH COLOR) → DATA 2

FIG. 4E

DATA (0, 1, 0, 2)

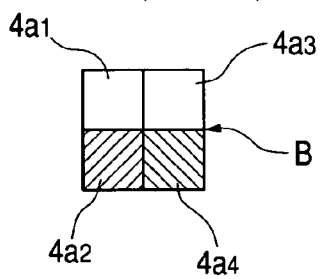

- □ ··· WHITE (FIRST COLOR) → DATA 0
- ■ ··· BLACK (SECOND COLOR) → DATA 4
- ▨ ··· RED (THIRD COLOR) → DATA 1
- ▨ ··· BLUE (FOURTH COLOR) → DATA 3
- ▤ ··· GREEN (FIFTH COLOR) → DATA 2

FIG. 4F

DATA (1, 3, 3, 2)

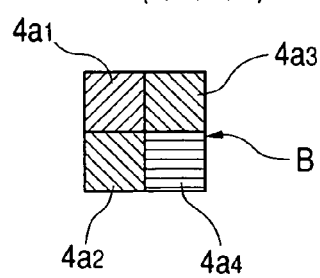

- □ ··· WHITE (FIRST COLOR) → DATA 0
- ■ ··· BLACK (SECOND COLOR) → DATA 4
- ▨ ··· RED (THIRD COLOR) → DATA 1
- ▨ ··· BLUE (FOURTH COLOR) → DATA 3
- ▤ ··· GREEN (FIFTH COLOR) → DATA 2

TWO-DIMENSIONAL CODE, METHODS AND APPARATUSES FOR GENERATING, DISPLAYING AND READING THE SAME

BACKGROUND OF THE INVENTION

The present invention relates to a two-dimensional code comprising unit cells arranged in two-dimension for indicating information, methods and an apparatuses for generating, displaying and reading the two-dimensional code.

A conventional two-dimensional code consists of black or white cells arranged in a matrix to indicate data. One of the black and white colors corresponds to one of bit values "0" and "1", and other of the black and white colors to other of bit values "0" and "1". After reading the cells, it is possible to digitize easily the read color data to decode it. The information density in the conventional two-dimensional code, however, is no more than two values "0" and "1" per cell.

From the background, it is considered to colorize each cell of a two-dimensional code to increase the information density in each cell. The cell is unit for indicating a piece of information.

As one of conventional methods of increasing the density in each cell, each cell can indicate one of a plurality of colors, such as white, black, red, blue, green. Each color selectively indicated in each cell corresponds to data set thereto.

For example, assuming that each cell can indicate one of different colors which correspond to five data values, it is possible to set one of the five data values to each cell.

When carrying out a reading process to the colorized two-dimensional code, the cells are read out so that which color is set to each of the cells is identified. The identified colors of cells are matched to the corresponding data values, respectively.

In the reading process to the two-dimensional code, it is important to read out precisely the colors of cells. In order to read out securely the colors of cells, an example of conventional two-dimensional codes comprises color samples corresponding to every color of cells and arranged close to the cells. The color sample allows the colors of cells to be securely read out, which is described in Japanese Patent Publication NO. H10-283446.

Japanese Patent Publication NO. 2000-67191 discloses a conventional method of generating a barcode that is an example of colored two-dimensional codes.

The above conventional two-dimensional code remains technical problems described hereinafter that make difficult to put them into practical use.

First problem is that, when recording large volumes of data corresponding many colors on the conventional two-dimensional code in high density, it is difficult to detect the area in which the conventional two-dimensional code itself is located.

Second problem is that, when recording large volumes of data corresponding many colors on the conventional two-dimensional code in high density, errors are prone to occur in determining what color is set to each cell of the conventional two-dimensional code.

These problems cause an increase in the reading out time of the two-dimensional code, and that in the amount of correcting the errors that occur in the color determination process.

SUMMARY OF THE INVENTION

The present invention is made on the background.

Accordingly, it is an object of the present invention to provide a two-dimensional code, methods and apparatuses for generating, displaying and reading the two-dimensional code. These two-dimensional code, methods and apparatuses are capable of rapidly detecting an area in which colored cells of the two-dimensional code are located, reducing time required for reading out the colored cells and reducing the amount of correcting errors that occur in determining what color is set to each cell of the two-dimensional code.

According to an aspect of the present invention, there is provided a two-dimensional code comprising: a plurality of unit cells arranged in two-dimension, each of the unit cells indicating one of at least three colors, each color of each of the unit cells being optically readable and representing a data value set to each of the unit cells; and a specifying pattern portion including a plurality of color reference cells and configured to specify positions of the unit cells, the color reference cells indicating all of the at least three colors.

According to another aspect of the present invention, there is provided a two-dimensional information code comprising: a plurality of blocks each including a plurality of unit cells, the plurality of blocks being arranged in two-dimension, each of the unit cells indicating one of at least three colors, the at least three colors being optically readable, a combination of the colors assigned to each block representing data; and a specifying pattern portion including a plurality of color reference cells arranged among the plurality of blocks, the specifying pattern portion specifying positions of the unit cells of each of the blocks, the color reference cells indicating all of the at least three colors.

According to further aspect of the present invention, there is provided a generating apparatus for generating a two-dimensional code for representing data values, the two-dimensional code comprising a plurality of unit cells, the generating apparatus comprising: a controller; and a memory connected thereto and having a two-dimensional storage area, the controller being configured to: assign one of at least three colors to each of the unit cells, each color of each of the unit cells being optically readable and representing each of the data values; arrange the plurality of unit cells on the two-dimensional storage area in two-dimension; and allocate a specifying pattern portion on the two-dimensional storage area at a position adjacent to the unit cells so as to generate the two-dimensional code on the two-dimensional storage area, the specifying pattern including a plurality of color reference cells and configured to specify positions of the unit cells, the color reference cells indicating all of the at least three colors.

According to still further aspect of the present invention, there is provided a generating apparatus for generating a two-dimensional code for representing data, the two-dimensional code comprising a plurality of blocks each including a plurality of unit cells, the generating apparatus comprising: a controller; and a memory connected thereto and having a two-dimensional storage area, the controller being configured to: divide the data into a plurality of pieces of data, the pieces of data corresponding to the blocks, respectively; compute a data value of each of the pieces of data; assign one of at least three colors to each of the unit cells of each of the blocks, each color of each of the unit cells being optically readable, a combination of the colors assigned to each of the blocks representing each of the computed data values; arrange the colored blocks on the two-dimensional storage area in two-dimension; and allocate a specifying pattern portion on the two-dimensional storage area at a position adjacent to the blocks so as to generate the two-dimensional code on the two-dimensional storage area, the specifying pattern including a plurality of color reference cells and configured to specify positions of the unit cells, the color reference cells indicating all of the at least three colors.

According to still further aspect of the present invention, there is provided a reading apparatus for reading a two-dimensional code, in which the two-dimensional code comprising: a plurality of unit cells arranged in two-dimension, each of the unit cells indicating one of at least three colors, each color of each of the unit cells being optically readable and representing a data value set to each of the unit cells; and a specifying pattern portion including a plurality of color reference cells and configured to specify positions of the unit cells, the color reference cells indicating all of the at least three colors, the at least three colors having predetermined brightness levels to be optically identifiable thereamong, the reading apparatus comprising: a reading unit configured to read out the two-dimensional code to generate at least three color image corresponding to the at least three colors; a generating unit configured to generate brightness image data according to the at least three color image data, the brightness image data comprising at least two gray levels, one of which is higher than other thereof; a detecting unit configured to detect the specified pattern portion according to the at least two gray levels included in the generated brightness image data; an identifying unit configured to identify the at least three colors according to the color reference cells of the specified pattern portion; a specifying unit configured to specify each color assigned to each of the unit cells according to the colors of the color reference cells and the at least three color image data; and a decoding unit configured to decode the data value of each of the unit cells according to the specified color of each of the unit cells.

According to still further aspect of the present invention, there is provided a displaying apparatus for displaying a two-dimensional code, in which the two-dimensional code comprising: a plurality of unit cells arranged in two-dimension, each of the unit cells indicating one of at least three colors, each color of each of the unit cells being optically readable and representing a data value set to each of the unit cells, a set of all of the data values of the unit cells representing data; and a specifying pattern portion including a plurality of color reference cells and configured to specify positions of the unit cells, and the color reference cells indicating all of the at least three colors, the displaying apparatus comprising: a dividing unit configured to divide the data into a number of pieces of data; a converting unit configured to convert the pieces of data into a number of two-dimensional code elements in a predetermined order, the number of two-dimensional code elements corresponding to the number of the pieces of data; and a displaying unit configured to display switchably the two-dimensional code elements in the predetermined order.

According to still further aspect of the present invention, there is provided a method of generating a two-dimensional code for representing data, the two-dimensional code comprising a plurality of blocks each including a plurality of unit cells, the method comprising: dividing the data into a plurality of pieces of data, the pieces of data corresponding to the blocks, respectively; computing a data value of each of the pieces of data; assigning one of at least three colors to each of the unit cells of each of the blocks, each color of each of the unit cells being optically readable, a combination of the colors assigned to each of the blocks representing each of the computed data values; arranging the colored blocks on a two-dimensional storage area in two-dimension; and allocating a specifying pattern portion on the two-dimensional storage area at a position adjacent to the blocks so as to generate the two-dimensional code on the two-dimensional storage area, the specifying pattern including a plurality of color reference cells and configured to specify positions of the unit cells, the color reference cells indicating all of the at least three colors.

According to still further aspect of the present invention, there is provided a method of reading a two-dimensional code, in which the two-dimensional code comprising: a plurality of unit cells arranged in two-dimension, each of the unit cells indicating one of at least three colors, each color of each of the unit cells being optically readable and representing a data value set to each of the unit cells; and a specifying pattern portion including a plurality of color reference cells and configured to specify positions of the unit cells, the color reference cells indicating all of the at least three colors, the at least three colors having predetermined contrast levels to be optically identifiable thereamong, the method comprising: reading out the two-dimensional code to generate at least three color image data corresponding to the at least three colors; generating brightness image data comprising according to the at least three color image data, the brightness image data comprising at least two gray levels, one of which is higher than other thereof; detecting the specified pattern portion according to the at least two gray levels included in the generated brightness image data; identifying the at least three colors according to the color reference cells of the specified pattern portion; specifying each color assigned to each of the unit cells according to the colors of the color reference cells and the at least three color image data; and decoding the data value of each of the unit cells according to the specified color of each of the unit cells.

According to still further aspect of the present invention, there is provided a method of displaying a two-dimensional code, in which the two-dimensional code comprising: a plurality of unit cells arranged in two-dimension, each of the unit cells indicating one of at least three colors, each color of each of the unit cells being optically readable and representing a data value set to each of the unit cells, a set of all of the data values of the unit cells representing data; and a specifying pattern portion including a plurality of color reference cells and configured to specify positions of the unit cells, and the color reference cells indicating all of the at least three colors, the method comprising: dividing the data into a number of pieces of data; converting the pieces of data into a number of two-dimensional code elements in a predetermined order, the number of two-dimensional code elements corresponding to the number of the pieces of data; and displaying switchably the two-dimensional code elements in the predetermined order.

According to still further aspect of the present invention, there is provided a computer readable program product for generate a two-dimensional code for representing data, the two-dimensional code comprising a plurality of blocks each including a plurality of unit cells, the program product configured to cause a computer to: divide the data into a plurality of pieces of data, the pieces of data corresponding to the blocks, respectively; compute a data value of each of the pieces of data; assign one of at least three colors to each of the unit cells of each of the blocks, each color of each of the unit cells being optically readable, a combination of the colors assigned to each of the blocks representing each of the computed data values; arrange the colored blocks on a two-dimensional storage area in two-dimension, the two-dimensional area being located in a memory, the computer being accessible to the memory; and allocate a specifying pattern portion on the two-dimensional storage area at a position adjacent to the blocks so as to generate the two-dimensional code on the two-dimensional storage area, the specifying pattern including a plurality of color reference cells and configured to specify positions of the unit cells, the color reference cells indicating all of the at least three colors.

According to still further aspect of the present invention, there is provided a computer readable program product for reading a two-dimensional code, in which the two-dimensional code comprising: a plurality of unit cells arranged in two-dimension, each of the unit cells indicating one of at least three colors, each color of each of the unit cells being optically readable and representing a data value set to each of the unit cells; and a specifying pattern portion including a plurality of color reference cells and configured to specify positions of the unit cells, the color reference cells indicating all of the at least three colors, the at least three colors having predetermined contrast levels to be optically identifiable thereamong, the program product configured to cause a computer to: read out the two-dimensional code to generate at least three color image data corresponding to the at least three colors; generate brightness image data according to the at least three color image data, the brightness image data comprising at least two gray levels, one of which is higher than other thereof; detect the specified pattern portion according to the predetermined contrast level included in the generated brightness image data; identify the at least three colors according to the color reference cells of the specified pattern portion; specify each color assigned to each of the unit cells according to the colors of the color reference cells and the at least three color image data; and decode the data value of each of the unit cells according to the specified color of each of the unit cells.

According to still further aspect of the present invention, there is provided a computer readable program product for displaying a two-dimensional code, in which the two-dimensional code comprising: a plurality of unit cells arranged in two-dimension, each of the unit cells indicating one of at least three colors, each color of each of the unit cells being optically readable and representing a data value set to each of the unit cells, a set of all of the data values of the unit cells representing data; and a specifying pattern portion including a plurality of color reference cells and configured to specify positions of the unit cells, and the color reference cells indicating all of the at least three colors, the program product configured to cause a computer to: divide the data into a number of pieces of data; convert the pieces of data into a number of two-dimensional code elements in a predetermined order, the number of two-dimensional code elements corresponding to the number of the pieces of data; and display switchably the two-dimensional code elements in the predetermined order.

BRIEF DESCRIPTION OF THE DRAWINGS

Other objects and aspects of the invention will become apparent from the following description of embodiments with reference to the accompanying drawings in which:

FIG. 1A is a view illustrating a structure of an example of two-dimensional codes according to a first embodiment of the present invention;

FIG. 2A is a view illustrating a two-dimensional code of one of second modifications of the two-dimensional code according to the first embodiment;

FIG. 2B is a view illustrating a two-dimensional code of another one of the second modifications of the two-dimensional code according to the first embodiment;

FIG. 2C is a view illustrating a two-dimensional code of another one of the second modifications of the two-dimensional code according to the first embodiment;

FIG. 4A is a view illustrating a conventional block structure consisting of nine cells;

FIG. 4B is a view illustrating a bock structure consisting of four cells according to the first embodiment of the present invention;

FIG. 4C is a view illustrating four cells of the block to which different colors of "red", "green", "blue", and "white" are assigned according to the first embodiment;

FIG. 4D is a view illustrating nine cells of the block to which colors of "black" and "white" are assigned to represent the data value 255 in decimal;

FIG. 4E is a view illustrating a color arrangement of the four cells of the block indicating the data value 255 in decimal, wherein no shifting operation is given to the block according to the first embodiment of the present invention;

FIG. 4F is a view illustrating a color arrangement of the four cells of the block indicating the data value 255 in decimal, wherein the shifting operation is given to the block according to the first embodiment of the present invention;

DETAILED DESCRIPTION OF EMBODIMENTS OF THE INVENTION

Figure 1B:
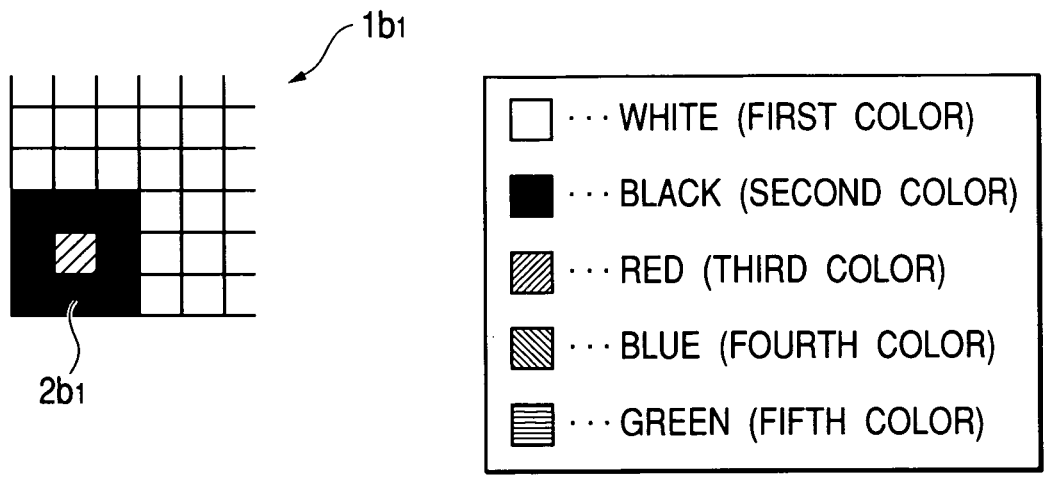
FIG. 1B is a partially enlarged view illustrating a structure of one of first modifications of the two-dimensional code according to the first embodiment.

Embodiments of the invention will be described hereinafter with reference to the accompanying drawings. In this embodiment, first, various two-dimensional codes according to the present invention will be described hereinafter, and after that, a reading method of the various two-dimensional codes described.

(1) Explanation of Outlines of the Various Two-dimensional Codes According to the Present Invention (1-1) An Example of the Two-dimensional Codes According to a First Embodiment of the Present Invention FIG. 1A shows a structure of the example of the two dimensional codes according to the first embodiment of the present invention.

The two-dimensional code 1 shown in FIG. 1A is written on, for example, a label that is a piece of paper or another media by printing or other similar methods. The label can be attached on goods, which is the same as general barcodes. The two-dimensional code 1 includes information, such as, a manufactures serial number, a name, a unique identification number and a date of manufacture of the goods.

As shown in FIG. 1A, the two-dimensional code 1 includes first to fifth position (orientation) detecting patterns 2a to 2e as specifying patterns, and a data area 3.

That is, the two-dimensional code 1 comprises a plurality of unit cells 4 each having a substantially square or rectangular shape. The unit cells 4 are arranged in two-dimension. In this first embodiment, the unit cells 4 are arranged in a matrix (rows and columns forming a matrix configuration). For example, as shown in FIG. 1A, the matrix is composed of 26 rows and 26 columns.

In this first embodiment, the top-left corner cell of the unit cells 4, that is located in the first row and the first column thereof is labeled with 4(1,1), and the rest unit cells 4 in the first row are sequentially labeled with 4(1,2), 4(1,3), . . . , 4(1,26).

Similarly, the unit cells 4 in the second row are labeled with 4(2,1), 4(2,2), 4(2,3), . . . , 4(2,26), the unit cells 4 in the third row are labeled with 4(3,1), 4(3,2), . . . , 4(3,26), . . . , the unit cells 4 in the twenty-five row are labeled with 4(25,1), 4(25,2), . . . , 4(25,25), and the unit cells 4 in the twenty-six row are labeled with 4(26,1), 4(26,2), . . . , 4(26,26).

Portions of the unit cells 4 are utilized for the first to fifth position detecting patterns 2a to 2e and the rest thereof for the data area 3. The unit cell is referred to simply as "cell" hereinafter.

Data values and error correction codes for correcting the data values when reading out the data values are replaced with first and fifth data indicating colors to be indicated on the data area 3 (corresponding to the unit cells 4).

That is, each of the cells 4 of the data area 3 can indicate one of the first to fifth data indicating colors. "White", "black", "red", "green" and "blue" are assigned to the first, second, third, fourth and fifth data indicating colors, respectively. One of the "white" and "black" against other thereof has the highest contrast so that the "white" and "black" are assigned to the first and second data indicating colors, respectively. Light's three primary colors of "red", "green", and "blue" are selected to be assigned to the third, fourth, and fifth data indicating colors on the ground that the first to fifth data indicating colors are needed to be optically read out. The above assignments of the colors to the first to fifth data indicating colors are not limited to this first embodiment. Other any colors that can be optically read out and identified from each other may be assigned to the first to fifth data indicating colors.

The first position detecting pattern 2a is arranged at one of the corner portions, for example, the top-left corner portion of the two-dimensional code 1 shown in FIG. 1. The position detecting pattern 2a has the largest area in the position detecting patterns. The second to fourth position detecting patterns 2b to 2d are arranged at rest corner portions of the two-dimensional code 1, respectively. For example, the second, third and fourth position detecting patterns 2b, 2c and 2d are arranged at the bottom-left, bottom-right and top-right corner portions of the two-dimensional code 1 shown in FIG. 1A, respectively. The fifth position detecting portion 2e is arranged at the center of the two-dimensional code 1.

The first position detecting pattern 2a comprises a center portion of cells 4(3,3), 4(3,4), 4(4,3), 4(4,4), a middle frame portion of cells 4(2,2), 4(2,3), 4(2,4), 4(2,5), 4(3,2), 4(3,5), 4(4,2), 4(4,5), 4(5,2), 4(5,3), 4(5,4), 4(5,5) that surrounds the center portion, and an outer frame portion of cells 4(1,1), 4(1,2), . . . , 4(1,5), 4(2,1), 4(2,6), 4(3,1), 4(3,6), 4(4,1), 4(4,6), 4(5,1), 4(5,6), 4(6,1), 4(6,6) that surrounds the middle frame portion.

The second position detecting pattern 2b comprises a center portion of cell 4(25,2), and an outer frame portion of cells 4(24,1), 4(24,2), 4(24,3), 4(25,1), 4(25,3), 4(26,1), 4(26,2), 4(26,3) that surrounds the center portion. The third position detecting pattern 2c comprises a center portion of cell 4(25,25), and an outer frame portion of cells 4(24,24), 4(24,25), 4(24,26), 4(25,24), 4(25,26), 4(26,24), 4(26,25), 4(26,26) that surrounds the center portion. The fourth position detecting pattern 2d comprises a center portion of cell 4(2,25), and an outer frame portion of cells 4(1,24), 4(1,25), 4(1,26), 4(2,24), 4(2,26), 4(3,24), 4(3,25), 4(3,26) that surrounds the center portion. The fifth position detecting pattern 2e comprises a center portion of cell 4(12,12), and an outer frame portion of cells 4(11,11), 4(11,12), 4(11,13), 4(12,11), 4(12,13), 4(13,11), 4(13,12), 4(13,13) that surrounds the center portion.

In this first embodiment, the first to fifth position detecting patterns 2a to 2e are served as color reference portions (cells). That is, the first to fifth colors are assigned to the position detecting patterns 2a to 2e according to the following table 1.

TABLE 1

| POSITION DETECTING PATTERN | MIDDLE FRAME PORTION | CENTER PORTION, OUTER FRAME PORTION |
|---|---|---|
| FIRST POSITION DETECTING PATTERN 2a | FIRST COLOR (WHITE) | SECOND COLOR (BLACK) |
| | CENTER PORTION | OUTER FRAME PORTION |
| SECOND POSITION DETECTING PATTERN 2b | FIRST COLOR (WHITE) | THIRD COLOR (RED) |
| THIRD POSITION DETECTING PATTERN 2c | FIRST COLOR (WHITE) | SECOND COLOR (BLACK) |

TABLE 1-continued

| POSITION DETECTING PATTERN | MIDDLE FRAME PORTION | CENTER PORTION, OUTER FRAME PORTION |
|---|---|---|
| FOURTH POSITION DETECTING PATTERN 2d | FIRST COLOR (WHITE) | FOURTH COLOR (BLUE) |
| FIFTH POSITION DETECTING PATTERN 2e | FIRST COLOR (WHITE) | FIFTH COLOR (GREEN) |

In this first embodiment, the first color of "white" is assigned to the middle frame portion of the first position detecting pattern 2a and the center portions of the second to fifth position detecting patterns 2b to 2e. The second color of "black" is assigned to the center portion and the outer frame portion of the first position detecting pattern 2a.

That is, the first color of "white" and the second color of "black" have large optical contrast between each other are assigned to the first position detecting pattern 2a.

Other colors of "red", "black", "blue" and "green" are assigned to the outer frame portions of the second to fifth position detecting patterns 2b to 2e, respectively.

In FIG. 1A, the right-hatched cells represent cells to which the third color (red) is assigned, the left-hatched cells represent cells to which the fourth color (blue) is assigned, and the horizontal-hatched cells denote cells to which the fifth color (green) is assigned.

That is, the first color (white) and the third color (red) are assigned to the cells 4 of the second position detecting pattern 2b, the first color (white) and the second color (black) are assigned to the cells 4 of the third position detecting pattern 2c. In addition, the first color (white) and the fourth color (blue) are assigned to the cells 4 of the fourth position detecting pattern 2d, and the first color (white) and the fifth color (green) are assigned to the cells 4 of the fifth position detecting pattern 2e.

Colors of "red", "black", "blue", and "green" are assigned to the outer frame portions of the second to fifth position detecting patterns 2b to 2e, respectively.

In FIG. 1A and other figures, the right-hatched cells represent cells to which the third color (red) is assigned, the left-hatched cells represent cells to which the fourth color (blue) is assigned, and the horizontal-hatched cells denote cells to which the fifth color (green) is assigned.

That is, the third color (red) is assigned to the cells 4 of the outer frame portion of the second position detecting pattern 2b, and the second color (black) is assigned to the cells 4 of the outer frame portion of the third position detecting pattern 2c. In addition, the fourth color (blue) is assigned to the cells 4 of the outer frame portion of the fourth position detecting pattern 2d, and the fifth color (green) is assigned to the cells 4 of the outer frame portion of the fifth position detecting pattern 2e.

Incidentally, in the FIG. 1A and other figures, the black-colored cells 4 of the specifying patterns 2a and 2c represent cells to which the second color (black) is assigned, and the white-colored cells 4 of each of the specifying patterns 2a to 2e represent cells to which the first color (white) is assigned. However, the color of each of the cells 4 in the data area 3 may look like "white", but any one of first-fifth colors is assigned to each of the cells 4 in the data area 3.

The above configuration of two-dimensional code 1 allows the position detecting patterns 2a to 2d and 2e located at its four corner portions and the center portion to specify the position (orientation) of the data area 3 (cells 4) and to show every color indicated by every cell 4 of the data area 3.

Especially, the position of the position detecting pattern 2e is previously fixed at the center of the two-dimensional code 1 so that, when the orientation of the two-dimensional code 1 is detected on the basis of the position detecting patterns 2a to 2d at the four corner portions of the two-dimensional code 1, the matrix size of the two-dimensional code 1, such as (26 cells×26 cells), is also detected on the basis of the relative positional relationships between the position detecting pattern 2e and each of the position detecting patterns 2a to 2d.

Because the colors assigned to the position detecting patterns 2a to 2e are previously determined based on the two-dimensional code's size (26×26), the detection of the two-dimensional code's size (26×26) can identify every color assigned to the position detecting patterns 2a to 2e. In addition, the detection of the two-dimensional code's size (26×26) can identify each position of each unit cell 4 based on the detected positions of the position detecting patterns 2a to 2e, respectively.

When reading out the two-dimensional code 1, therefore, it is possible to specify accurately rapidly the orientations (positions) and the range of the cells 4 of the data area 3 and to obtain the color information related to every color indicated by the data area 3, thereby surely reading out the pieces of data corresponding to the cells 4. Concrete reading process will be described hereinafter.

Figure 1C:
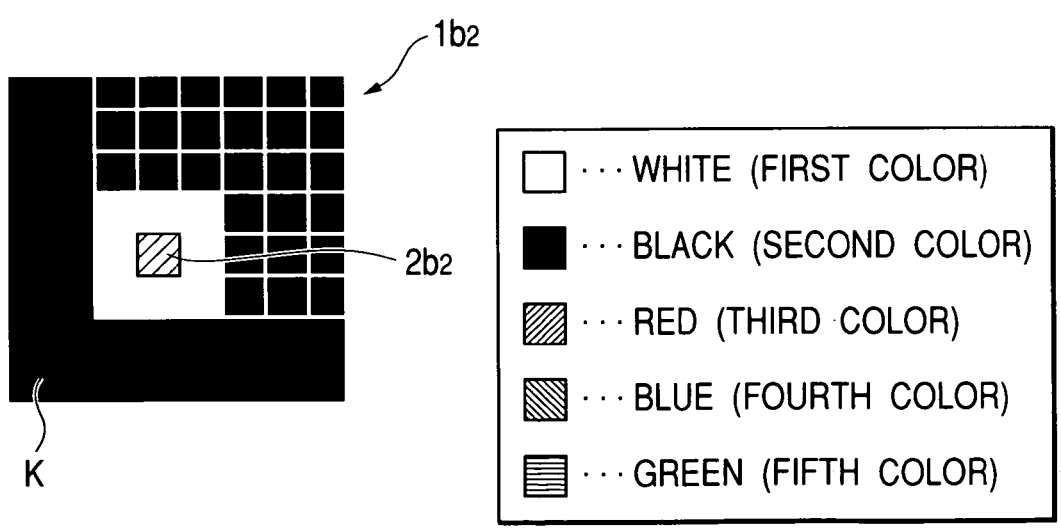
FIG. 1C is a partially enlarged view illustrating a structure of other of the first modifications of the two-dimensional code according to the first embodiment.

(1-2) First Modifications of the Two-dimensional Code According to the First Embodiment First modifications of the two-dimensional code 1 are shown in FIGS. 1B and 1C. In these first modifications, at least one of the colors assigned to the at least one of the position detecting patterns is changed. In FIG. 1B, the colors assigned to the second position detecting pattern 2b1 of the two-dimensional code 1b1 according to the first modifications are changed as compared to those to the second position detecting pattern 2b shown in FIG. 1A.

In FIG. 1B, the third color (red) is assigned to the center portion of the second position detecting pattern 2b1, and the second color (black) is assigned to the outer frame portion thereof. Similarly, the colors assigned to other position detecting patterns (not shown) may be changed in the same manner of the second position detecting pattern 2b1.

These changes of colors assigned to the position detecting patterns can be made as long as the position detecting patterns include all of colors, that is, the first color (white) to the fifth color (green), indicated by all of cells 4 of the data area 3.

In another one of the first modifications, if a background area K of the label against the two-dimensional code is colored in black or other similar dark color, the outer frame portions of the position detecting patterns 2a2 to 2e2 can be indicated in bright color, such as "white". FIG. 1C shows only the position detecting pattern 2b2 of the two-dimensional code 1b2 according to the first modifications on behalf of the position detecting patterns 2a2 to 2e2 thereof.

In another one of the first modifications, the center portions and the middle frame portions of the position detecting patterns 2a2 to 2e2 of the two-dimensional code 1b2, which are colored in white in the two-dimensional code 1, may be indicated in "black", "red", "blue", and "green" except for the "white". That is, the outer frame portions, which are adjacent to the background area K of the label, of every position detecting pattern of the two-dimensional code 1b2 indicates "white". The "white" is the opponent color of "white" so as to enhance the contrast between the two-dimensional code 1b2 and the background area K there against, making it possible to surely read out the two-dimensional code 1b2.

(1-3) Second Modifications of the Two-dimensional Code According to the First Embodiment FIGS. 2A to 2C show two-dimensional codes 5, 6, and 7 of second modifications of the two-dimensional code 1, that include different specifying patterns from those of the two-dimensional code 1, respectively.

The two-dimensional code 5 shown in FIG. 2A includes a position detecting pattern 5a, a four-color reference pattern 5b, a first timing pattern 5c and a second timing pattern 5d, and a data area 3a. These patterns 5a to 5d correspond to specifying patterns.

In this modification, the square-shaped unit cells 4 are arranged in a matrix of, for example 17 rows and 17 columns. They are labeled with 4(1,1), 4(1,2), ..., 4(1,17), 4(2,1), ..., 4(17,1), ..., 4(17,17) in the same manner of the two-dimensional code 1.

Similarly, to the two-dimensional code 1, portions of the unit cells 4 are utilized for the position detecting pattern 5a, the four-color reference pattern 5b, and the first and second timing patterns 5c and 5d, and the rest thereof for the data area 3a. Each of the cells 4 of the data area 3a can indicate one of the first to fifth data indicating colors.

The position detecting pattern 5a is arranged at the top-left corner portion of the two-dimensional code 5 shown in FIG. 2A, which is the same as the position detecting pattern 2a. The four-color reference pattern 5b is arranged at, for example, the bottom-right corner portion of the two-dimensional code 5, that is diagonally located therein.

The four-color reference pattern 2b comprises four cells of 4(16,16), 4(16,17), 4(17,16), 4(17,17) in a matrix.

The colors except for the black, such as white, red, green, and blue are assigned to the four cells of the four-color reference pattern 5b, respectively.

The first timing pattern 5c is arranged at one of the peripheral sides of the two-dimensional code 5, for example, at a first peripheral side corresponding to the first row portion thereof. That is, the first timing pattern 5c comprises cells 4(1,8), 4(1,10), ..., 4(1,17). In addition, the second timing pattern 5d is arranged at another one of the peripheral sides of the two-dimensional code 5, for example, at a second peripheral side corresponding to the first column portion which is adjacent to the first peripheral side. That is, the second timing pattern 5d comprises cells 4(8,1), 4(9,1), ..., 4(17,1).

The first timing pattern 5c is continuous to the position detecting pattern 5a in the first peripheral side of the two-dimensional code 5, which determines the size (length) of the first peripheral side of the two-dimensional code 5. The second timing pattern 5d is also continuous to the position detecting pattern 5a in the second peripheral side of the two-dimensional code 5, which determines the size (length) of the second peripheral side of the two-dimensional code 5.

The white colors are assigned to the alternate cells 4(1,8), 4(1,10), ..., 4(1,16) of the first timing pattern 5c, and colors of green, red, and blue are assigned to the rest cells 4(1,9), 4(1,11), ..., 4(1,17) in this order.

Similarly, the white colors are assigned to the alternate cells 4(8,1), 4(10,1), ..., 4(16,1), and colors of red, blue, and green are assigned to the rest cells 4(9,1), 4(11,1), ..., 4(17,1) in this order.

This two-dimensional code 5 allows the position detecting pattern 5a located at its top-left corner portion to specify the position (orientation) of the data area 3a (cells 4). In addition, the two-dimensional code 5 also allows the position detecting pattern 5a and the four-color reference pattern 5b located at its bottom-right corner portion to show every color indicated by every cell 4 of the data area 3a.

In addition, the first timing pattern 5c and second timing pattern 5d are arranged at adjacent peripheral sides of the two-dimensional code 5. When the orientation of the two-dimensional code 5 is detected on the basis of the position detecting pattern 5a, the first timing pattern 5c and the second timing pattern 5d are also easily detected because these color arrangements of the first timing pattern 5c and second timing pattern 5d are unique.

The detections of the position detecting pattern 5a, the first timing pattern 5c, and the second timing pattern 5d can specify the matrix size of the two-dimensional code 5, such as (17 cells×17 cells).

Because the colors assigned to the patterns 5a to 5d are previously determined based on the two-dimensional code's size (17×17), the detection of the two-dimensional code's size (17×17) can identify every color assigned to the patterns 5a to 5d. In addition, the detection of the two-dimensional code's size (17×17) can identify each position of each unit cell 4 based on the detected positions of the patterns 5a to 5d, respectively.

When reading out the two-dimensional code 5, therefore, it is possible to specify accurately rapidly the positions and the range of the cells 4 of the data area 3a and to obtain the color information related to every color indicated by the data area 3a, thereby surely reading out the pieces of data corresponding to the cells 4.

The two-dimensional code 6 shown in FIG. 2B includes a position detecting pattern 6a, first to third color reference patterns 6b to 6d, first and second timing patterns 6e and 6f, first to fifth position specifying patterns 6g to 6k, and a data area 3b. These patterns 6a to 6k correspond to specifying patterns.

In this modification, the square-shaped unit cells 4 are arranged in a matrix of, for example 33 rows and 33 columns. They are labeled with 4(1,1), 4(1,2), ..., 4(1,33), 4(2,1), ..., 4(33,1), ..., 4(33,33) in the same manner of the two-dimensional code 1.

Similarly to the two-dimensional code 1, portions of the unit cells 4 are utilized for the position detecting pattern 6a, the first to third color reference patterns 6b to 6d, the first and second timing patterns 6e and 6f, the first to fifth position specifying patterns 6g to 6k, and the rest thereof for the data area 3b. Each of the cells 4 of the data area 3b can indicate one of the first to fifth data indicating colors.

The position detecting pattern 6a is arranged at the top-left corner portion of the two-dimensional code 6 shown in FIG. 2B, which is the same as the position detecting pattern 2a. The first, second and third color reference patterns 6b, 6c and 6d are arranged at the bottom-left, bottom-right and top-right corner portions of the two-dimensional code 6 shown in FIG. 2B, respectively.

The first timing pattern 6e is arranged at the first peripheral side corresponding to the first row portion, which is the same as the first timing pattern 5c of the two-dimensional code 5. The second timing pattern 6f is arranged at the second peripheral side corresponding to the first column portion, which is the same as the second timing pattern 5d of the two-dimensional code 5.

The first to fourth position specifying patterns 6g to 6j are arranged at middle portions of the peripheral sides of the two-dimensional code 6, respectively. The fifth position specifying pattern 6k is arranged at the center of the two-dimensional code 6.

The first color reference pattern 6b comprises a center portion of cell 4(32,2), and an outer frame portion of cells 4(31,1), 4(31,2), 4(31,3), 4(32,1), 4(32,3), 4(33,1), 4(33,2), 4(33,3) that surrounds the center portion. The second color reference pattern 6c comprises a center portion of cell 4(32,32), and an outer frame portion of cells 4(31,31), 4(31,32), 4(31,33), 4(32,31), 4(32,33), 4(33,31), 4(33,32), 4(33,33) that surrounds the center portion. The third color reference pattern 6d comprises a center portion of cell 4(2,32), and an outer frame portion of cells 4(1,31), 4(1,32), 4(1,33), 4(2,31), 4(2,33), 4(3,31), 4(3,32), 4(3,33) that surrounds the center portion.

The first timing pattern 6e comprises cells 4(1,8), 4(1,9), . . . , 4(1,16), 4(1,20), 4(1,21), . . . , 4(1,33), and the second timing pattern 6f comprises cells 4(8,1), 4(9,1), . . . , 4(16,1), 4(20,1), 4(21,1), . . . , 4(33,1).

The first position specifying pattern 6g comprises a center portion of cell 4(18,2), and an outer frame portion of cells 4(17,1), 4(17,2), 4(17,3), 4(18,1), 4(18,3), 4(19,1), 4(19,2), 4(19,3) that surrounds the center portion. The second position specifying pattern 6h comprises a center portion of cell 4(32,18), and an outer frame portion of cells 4(31,17), 4(31,18), 4(31,19), 4(32,17), 4(32,19), 4(33,17), 4(33,18), 4(33,19) that surrounds the center portion. The third position specifying pattern 6i comprises a center portion of cell 4(18,32), and an outer frame portion of cells 4(17,31), 4(17,32), 4(17,33), 4(18,31), 4(18,33), 4(18,31), 4(18,32), 4(18,33) that surrounds the center portion. The fourth position specifying pattern 6j comprises a center portion of cell 4(2,18), and an outer frame portion of cells 4(1,17), 4(1,18), 4(1,19), 4(2,17), 4(2,19), 4(3,17), 4(3,18), 4(3,19) that surrounds the center portion. The fifth position detecting pattern 6k comprises a center portion of cell 4(18,18), and an outer frame portion of cells 4(17,17), 4(17,18), 4(17,19), 4(18,17), 4(18,19), 4(19,17), 4(19,18), 4(19,19) that surrounds the center portion.

The first color of "white" is assigned to the middle frame portion of the position detecting pattern 6a and the center portions of the patterns 6b to 6d, and 6g to 6k. The second color of "black" is assigned to the center portion and the outer frame portions of the patterns 6a, and 6g to 6k.

Other colors of "red", "blue" and "green" are assigned to the outer frame portions of the first to third color reference patterns 6b, 6c and 6d, respectively.

The white colors are assigned to the alternate cells 4(1,8), 4(1,10), . . . , 4(1,16), and those of 4(1, 20), 4(1,22), . . . , 4(1,30) of the first timing pattern 6e, and colors of red, blue, and green are assigned to the cells 4(1,9), 4(1,11), . . . , 4(1,15), 4(1,21), . . . , 4(1,29) in this order.

Similarly, the white colors are assigned to the alternate cells 4(8,1), 4(10,1), . . . , 4(16,1), and those of 4(20,1), 4(22,1), . . . , 4(30,1) of the second timing pattern 6e, and colors of blue, green, and red are assigned to the cells 4(1,9), 4(1,11), . . . , 4(1,15), 4(1,21), . . . , 4(1,29) in this order.

As well as the two-dimensional code 5, the two-dimensional code 6 allows the position detecting pattern 6a and the position specifying patterns 6g to 6h to specify the position (orientation) of the data area 3b (cells 4). In addition, the two-dimensional code 6 also allows the patterns 6a, 6g to 6k and the color reference patterns 6b to 6d to show every color indicated by every cell 4 of the data area 3b.

In addition, when the orientation of the two-dimensional code 6 is detected based on the position detecting pattern 6a, the first timing pattern 6e and the second timing pattern 6f are also easily detected, because these alternative color patterns are unique patterns.

The detections of the position detecting pattern 6a, the first timing pattern 6e, and the second timing pattern 6f can specify the matrix size of the two-dimensional code 6, such as (33 cells×33 cells).

Because the colors assigned to the patterns 6a to 6f are previously determined based on the two-dimensional code's size (33×33), the detection of the two-dimensional code's size (33×33) can identify every color assigned to the patterns 6a to 6f. In addition, the detection of the two-dimensional code's size (33×33) can identify each position of each unit cell 4 based on the detected positions of the patterns 6a to 6f, respectively.

When reading out the two-dimensional code 6, therefore, it is possible to specify accurately rapidly the positions and the range of the cells 4 of the data area 3b and to obtain the color information related to every color indicated by the data area 3b, thereby surely reading out the pieces of data corresponding to the cells 4.

The two-dimensional code 7 shown in FIG. 2C has the size that is larger than that of the two-dimensional code 5 and smaller than that of the two-dimensional code 6.

The two-dimensional code 7 includes a position detecting pattern 7a, first to third color reference patterns 7b to 7d, first and second timing patterns 7e and 7f, and a data area 3c. These patterns 7a to 7f correspond to specifying patterns.

In this modification, the square-shaped unit cells 4 are arranged in a matrix of, for example 21 rows and 21 columns. They are labeled with 4(1,1), 4(1,2), . . . , 4(1,21), 4(2,1), . . . , 4(21,1), . . . , 4(21,21) in the same manner of the two-dimensional code 1.

Similarly, to the two-dimensional code 1, portions of the unit cells 4 are utilized for the position detecting pattern 7a, the first to third color reference patterns 7b to 7d, the first and second timing patterns 7e and 7f, and the rest thereof for the data area 3c. Each of the cells 4 of the data area 3c can indicate one of the first to fifth data indicating colors.

The position detecting pattern 7a is arranged at the top-left corner portion of the two-dimensional code 7 shown in FIG. 2C, which is the same as the position detecting pattern 2a. The first, second and third color reference patterns 7b, 7c and 7d are arranged at the bottom-left, bottom-right and top-right corner portions of the two-dimensional code 7 shown in FIG. 2C, respectively.

The first timing pattern 7e is arranged at the first peripheral side corresponding to the first row portion, which is the same as the first timing pattern 5c of the two-dimensional code 5. The second timing pattern 7f is arranged at the second peripheral side corresponding to the first column portion, which is the same as the second timing pattern 5d of the two-dimensional code 5.

The structure of position detecting pattern 7a is the same as that of position detecting pattern 5a.

The first color reference pattern 7b comprises a center portion of cell 4(20,2), and an outer frame portion of cells 4(19,1), 4(19,2), 4(19,3), 4(20,1), 4(20,3), 4(21,1), 4(21,2), 4(21,3) that surrounds the center portion. The second color reference pattern 7c comprises a center portion of cell 4(20,20), and an outer frame portion of cells 4(19,19), 4(19,20), 4(19,21), 4(20,19), 4(20,21), 4(21,19), 4(21,20), 4(21,21) that surrounds the center portion. The third color reference pattern 7d comprises a center portion of cell 4(2,20), and an outer frame portion of cells 4(1,19), 4(1,20), 4(1,21), 4(2,19), 4(2,21), 4(3,19), 4(3,20), 4(3,21) that surrounds the center portion.

The first timing pattern 7e comprises cells 4(1,8), 4(1,9), ..., 4(1,18), and the second timing pattern 7f comprises cells 4(8,1), 4(9,1), ..., 4(18,1).

The first color of "white" is assigned to the middle frame portion of the position detecting pattern 7a and the center portions of the patterns 7b to 7d. The second color of "black" is assigned to the center portion and the outer frame portions of the position detecting pattern 7a.

Other colors of "red", "blue" and "green" are assigned to the outer frame portions of the first to third color reference patterns 7b, 7c and 7d, respectively.

The white colors are assigned to the alternate cells 4(1,8), 4(1,10), 4(1,18) of the first timing pattern 7e, and colors of green, red, and blue are assigned to the cells 4(1,9), 4(1,11), ..., 4(1,17) in this order.

Similarly, the white colors are assigned to the alternate cells 4(8,1), 4(10,1), ..., 4(18,1) of the second timing pattern 7e, and colors of red, blue, and green are assigned to the cells 4(1,9), 4(1,11), ..., 4(1,17) in this order.

As well as the two-dimensional code 5, the two-dimensional code 7 allows the position detecting pattern 7a to specify the position (orientation) of the data area 3c (cells 4). In addition, the two-dimensional code 7 also allows the position detecting pattern 7a and the color reference patterns 7b to 7d to show every color indicated by every cell 4 of the data area 3c.

In addition, when the orientation of the two-dimensional code 7 is detected on the basis of the position detecting pattern 7a, the first timing pattern 7e and the second timing pattern 7f are also easily detected because these alternative color patterns are unique patterns.

The detections of the position detecting pattern 7a, the first timing pattern 7e, and the second timing pattern 7f can specify the matrix size of the two-dimensional code 5, such as (21 cells×21 cells).

Because the colors assigned to the patterns 7a to 7f are previously determined based on the two-dimensional code's size (21×21), the detection of the two-dimensional code's size (21×21) can identify every color assigned to the patterns 7a to 7f. In addition, the detection of the two-dimensional code's size (21×21) can identify each position of each unit cell 4 based on the detected positions of the patterns 7a to 7f, respectively.

When reading out the two-dimensional code 7, therefore, it is possible to specify accurately rapidly the positions and the range of the cells 4 of the data area 3c and to obtain the color information related to every color indicated by the data area 3c, thereby surely reading out the pieces of data corresponding to the cells 4.

(2) Block Structure of Two-dimensional Code

Next, the block structure of the two-dimensional code 1 having the matrix size of (26 cells×26 cells) will be described hereinafter. Incidentally, the two-dimensional codes 5, 6, and 7 substantially have the same block structures, respectively.

Figure 3:
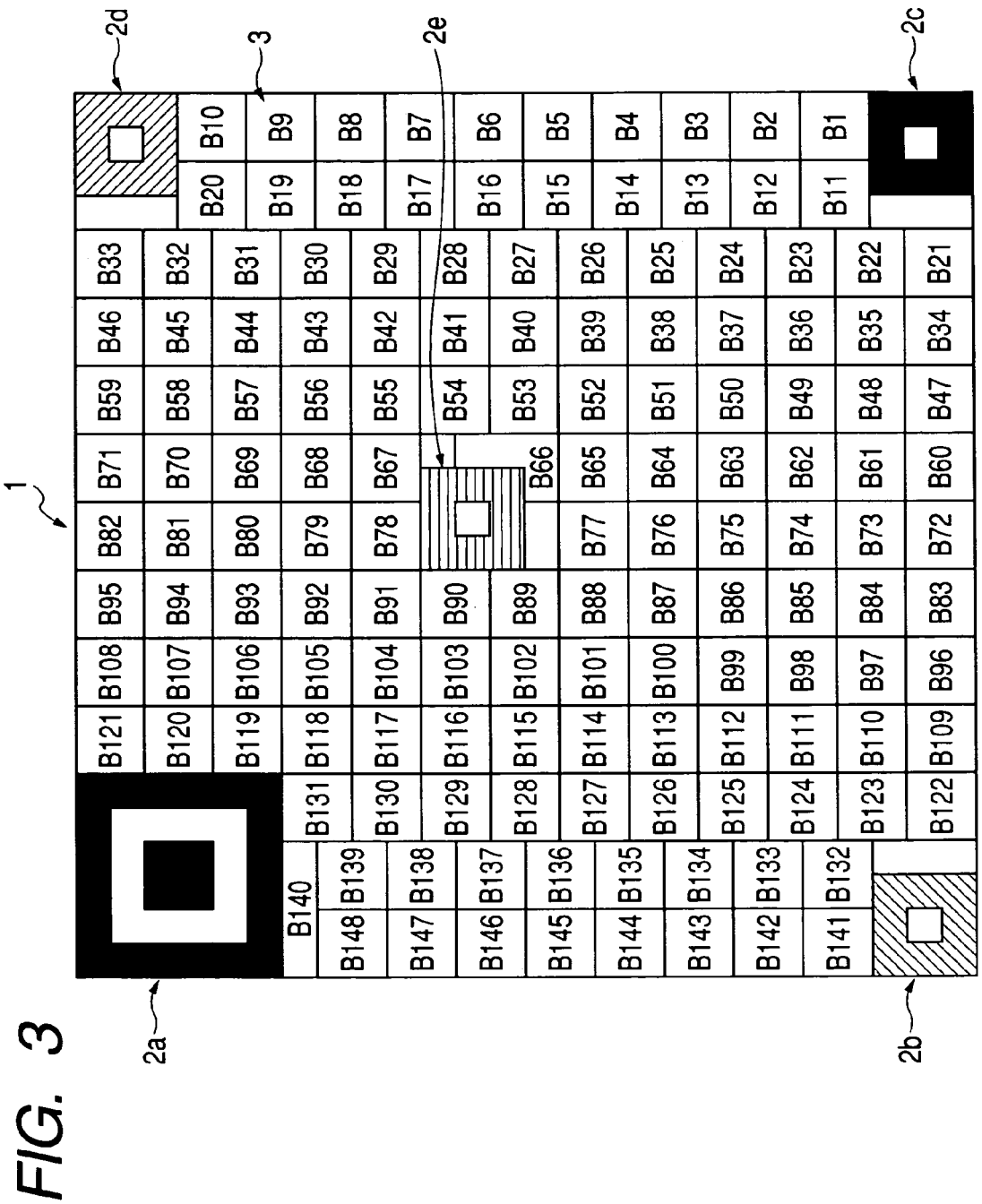
FIG. 3 is a view illustrating a block structure of the two-dimensional code shown in FIG. 1 according to the embodiment of the present invention.

As shown in FIG. 3, the unit cells 4 of the data area 3 of the two-dimensional code 1 are partitioned in blocks each comprising four unit cells. That is, the data area 3 of the two-dimensional code 1 is composed of a number of blocks B (B1~B148) each containing four unit cells 4, as shown in FIG. 4B. In this first embodiment, the reference character B represents each of the reference characters B1~B148. The blocks B1~B148 are arranged in a predetermined manner described hereinafter.

The size of each block B is set to be subject to covering the data size of conventional each block that consists of a set of eight black or white colored cells. That is, the data area 3 of the two-dimensional code 1 is configured that each block B consisting a set of four cells 4 represents data.

When using the block consisting of the set of eight cells each being colored in black or white, the block of the eight cells can take the data values in the range of $2^8$ (=256) pieces.

In contrast, in this first embodiment, the block B consists of the set of four cells 4 each being indicated in one of the first to fifth colors so that the block B of the four cells 4 can take the data values in the range of 625 (=$5^4$) pieces.

The range of the data values in the block B substantially corresponds to the range of 512 (=$2^9$) pieces in the block of the nine cells each being colored in black or white.

FIG. 4A illustrates the nine cells of the block so that FIGS. 4A and 4B show the correspondence between the nine cells of the block and the four cells 4 of the block B.

Next, how indicating the data in the four cells 4 of the block B will be described as follows.

As described above, the first to fifth data indicating colors are set to "white", "black", "red", "green", "blue", respectively, and one of data values "0" to "4" corresponds to one of the first to fifth colors.

For instance, the data value "0" corresponds to the first data indicating color "white", and the data value "1" corresponds to the third data indicating color "red". The data value "2" corresponds to the fifth data indicating color "green", the data value "3" corresponds to the fourth data indicating color "blue", and the data value "4" corresponds to the data indicating color "black".

Because any one of the data values "0", "1", "2", "3", and "4" is set to any one of the four cells 4 of the block B, it is possible to represent a data value into a quinary string in which i-th bit from the end carries weight $5^i$.

For example, the data value of 86 in decimal is represented by equation of "$5^3 \times 0 + 5^2 \times 3 + 5^1 \times 2 + 5^0 \times 1$" so as to be represented by (1, 2, 3, 0) which is generated by laying each of the 3-th bit "0", the 2-th bit "3", the 1-th bit "2", and the 0-th bit "1" in this order from the least significant bit "1" to the most significant bit "0".

In this first embodiment, the 0-th bit, 1-th bit, 2-th bit, and 3-th bit in the data (1, 2, 3, 0) are allocated to the unit cells 4 in a predetermined manner.

For example, the 0-th bit "1" in the data (1, 2, 3, 0) is allocated to one of the unit cells 4 in the block B, for example, the top-left unit cell 4a1 in the block B. The 1-th bit "2" is allocated to one of the remained unit cells 4 in the block B, such as the bottom-left unit cell 4a2 in the block B. In addition, the 2-th bit "3" is allocated to one of the remained unit cells 4 in the block B, for example, the top-right unit cell 4a3 in the block B, and the 3-th bit "0" is allocated to the remained bottom-right unit cell 4a2 in the block B.

With respect to the conventional block consisting of the set of nine cells each being colored in black or white, because the black or white color corresponds to the bit value "0" or "1", the block of the nine cells can take the data values in the range from a data value of 0 in decimal that is represented by (0, 0, 0, 0, 0, 0, 0, 0, 0) in the block to a data value of 256 in decimal (=$2^9$) that is represented by (1, 1, 1, 1, 1, 1, 1, 1, 1) therein.

In contrast, in this first embodiment, the block B consists of the set of four cells 4 each being indicated in one of the first to fifth colors so that the block B of the four cells 4 can take the data values in the range from a data value of 0 that is represented by (0, 0, 0, 0) in the block B to a data value of 625 in decimal (=$5^4$) that is represented by (4, 4, 4, 4) therein.

Next, the relationship between each data value of the block B and each data indicating color thereof will be described as follows.

Assuming that the data value of the conventional block is set to 0 and white corresponds to "0", the colors indicated by all cells in the block are white so that the data value represented in the cells of the block is (0, 0, 0, 0, 0, 0, 0, 0, 0), as shown in FIG. 4A.

Similarly, in the block B of this first embodiment, all cells 4 in the block B indicate the first color of white so that the data value represented in the cells 4 of the block B is (0, 0, 0, 0), as shown in FIG. 4B.

In this first embodiment, however, to prevent all cells 4 of the block B from being colored in white to improve the accuracy of reading the two-dimensional code 1, the block B is configured to indicate shift data values shifted by a constant value from the actual data values that are tried to be actually indicated.

That is, the range of data values that the block B can indicate is from the data value of 0 in decimal represented by (0, 0, 0, 0) to the data value of 625 in decimal represented by (4, 4, 4, 4). This range is larger than the range of data values that the conventional block can indicate is from the data value of 0 represented by (0, 0, 0, 0, 0, 0, 0, 0, 0) to the data value of 512 in decimal represented by (1, 1, 1, 1, 1, 1, 1, 1, 1). This means that the block B has the allowance that permits the actual data value to shift by the constant value.

In order to indicate the cells 4 of the block B, that are adjacent to each other, in different colors, respectively, even in a case where the actual data value is "0", the constant value is set to "86" in decimal that is represented by (1, 2, 3, 0) in the cells 4 of the block B.

That is, the constant value (1, 2, 3, 0) is indicated in the different colors of "red", "green", "blue", and "white" so that adding the constant value to the data value of "0" allows each of the colors of "red", "green", "blue", and "white" to be indicated in the block B (see FIG. 4C).

As a result, the data value of 255 in decimal is represented in the respective cells of the conventional block as (1, 1, 1, 1, 1, 1, 1, 1, 0) so that eight cells are indicated in color of "black" and the rest one cell in color of "white" (see FIG. 4D).

In a case of indicating the data value of 255 in decimal without giving the shifting operation thereto, the data value of 255 in decimal is represented by (0, 1, 0, 2) (see FIG. 4E). In this first embodiment, the constant value (1, 2, 3, 0) is added to the data value (0, 1, 0, 2) so that the data value of 255 is represented by (1, 3, 3, 2). The data value (1, 3, 3, 2) is indicated in the colors of "red", "blue", and "green". That is, the 0-th bit "1" in the data (1, 3, 3, 2) is allocated to the top-left unit cell 4a1 in the block B, and the 1-th bit "3" is allocated to the bottom-left unit cell 4a2 in the block B. In addition, the 2-th bit "3" is allocated to the top-right unit cell 4a3 in the block B, and the 3-th bit "2" is allocated to the remained bottom-right unit cell 4a2 in the block B (see FIG. 4F).

As described above, in this first embodiment, it is possible to represent the block B by the only four cells 4, and the block B can indicate the predetermined data range corresponding to that of a block of nine cells (nine bits), which are obtained by adding one cell (one bit) to the conventional block consisting of eight cells.

In addition, the shifting operation of the constant value to the actual data value of each cell 4 of the block B allows the block B to constantly indicate different colors, making it easy to distinguish the boundaries between the adjacent cells 4 of the block B, and likely to read out the cells 4 of the block B.

(3) Generation Process of the Two-dimensional Code

Next, the generation process of the above two-dimensional codes 1, 1b1–1b2, 5 to 7 and so on according to a second embodiment of the present invention will be described hereinafter with reference to FIGS. 5 to 7. In this second embodiment, in order to simplify the explanation of the generation process, the generation process of the two-dimensional code 1 will be described as an example.

Figure 5:
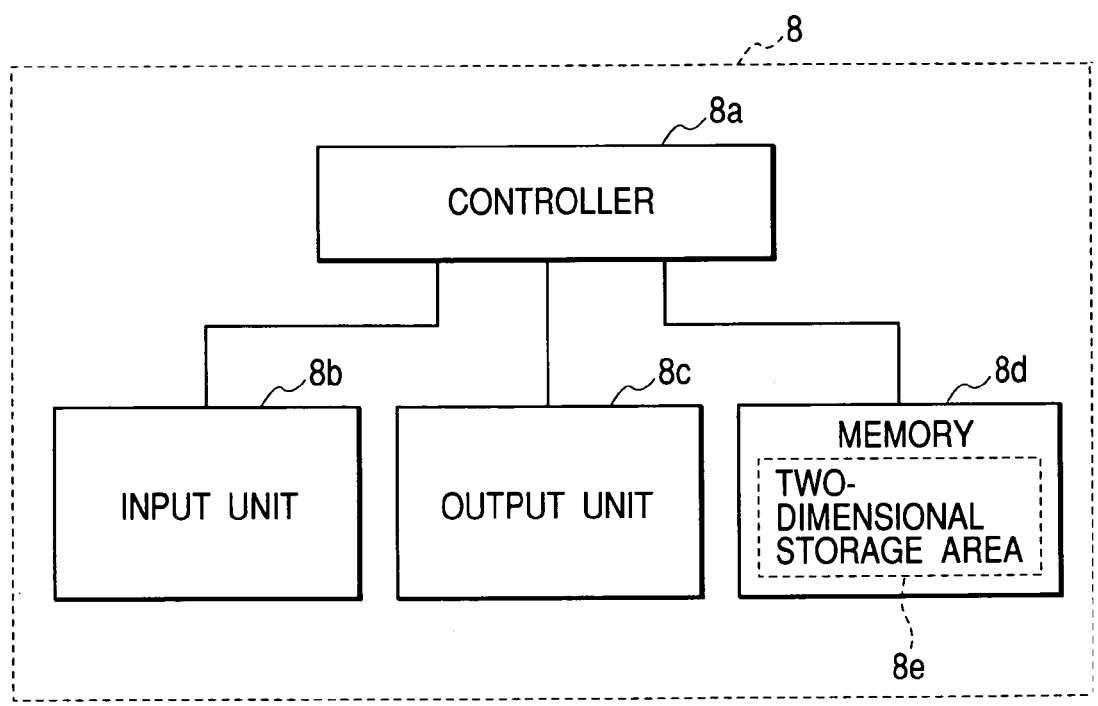
FIG. 5 is a block diagram illustrating a control system as a generating apparatus for generating the two-dimensional codes related to the first embodiment according to a second embodiment of the present invention.

FIG. 5 illustrates a control system 8 as a generating apparatus for generating the two-dimensional code 1. The control system 8 comprises a controller 8a, an input unit 8b, an output unit 8c, a memory 8d, and so on, and they are electrically connected to each other. As the control system 8, a computer system can be applied. The computer system can execute a sequence of operations, such as program stored on the memory 8d, in a distinctly and explicitly defined manner to manipulate data.

The output unit 8c includes, for example, a printer for converting image data transmitted from the controller 8a into a readable or pictorial form on a sheet of paper or other similar media, or a display for converting image data fed from the controller 8a into an image to display the image on its screen.

Figure 6:
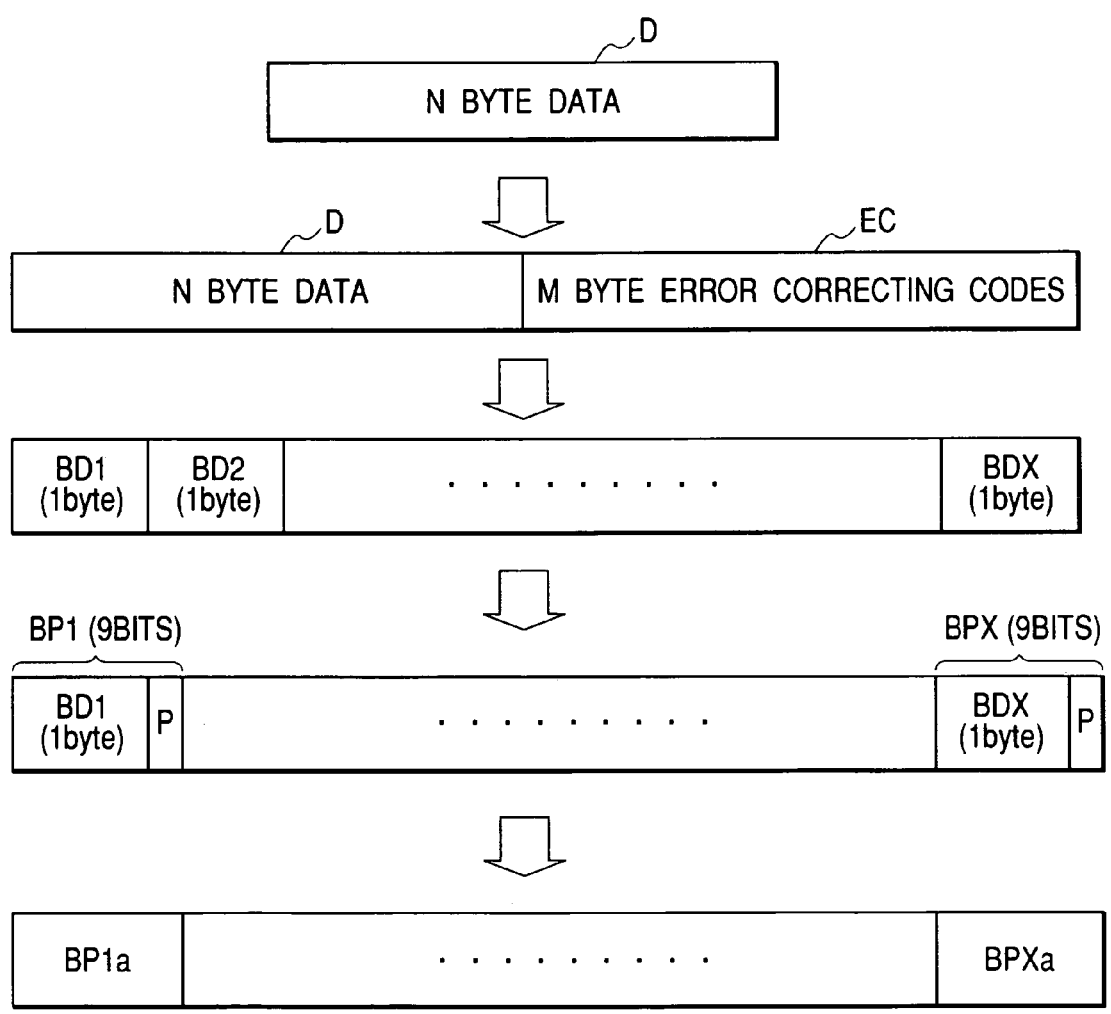
FIG. 6 is a data flow diagram illustrating changes of a data structure of N byte data according to generating process of the control system shown in FIG. 5 according to the second embodiment of the present invention.
Figure 7:
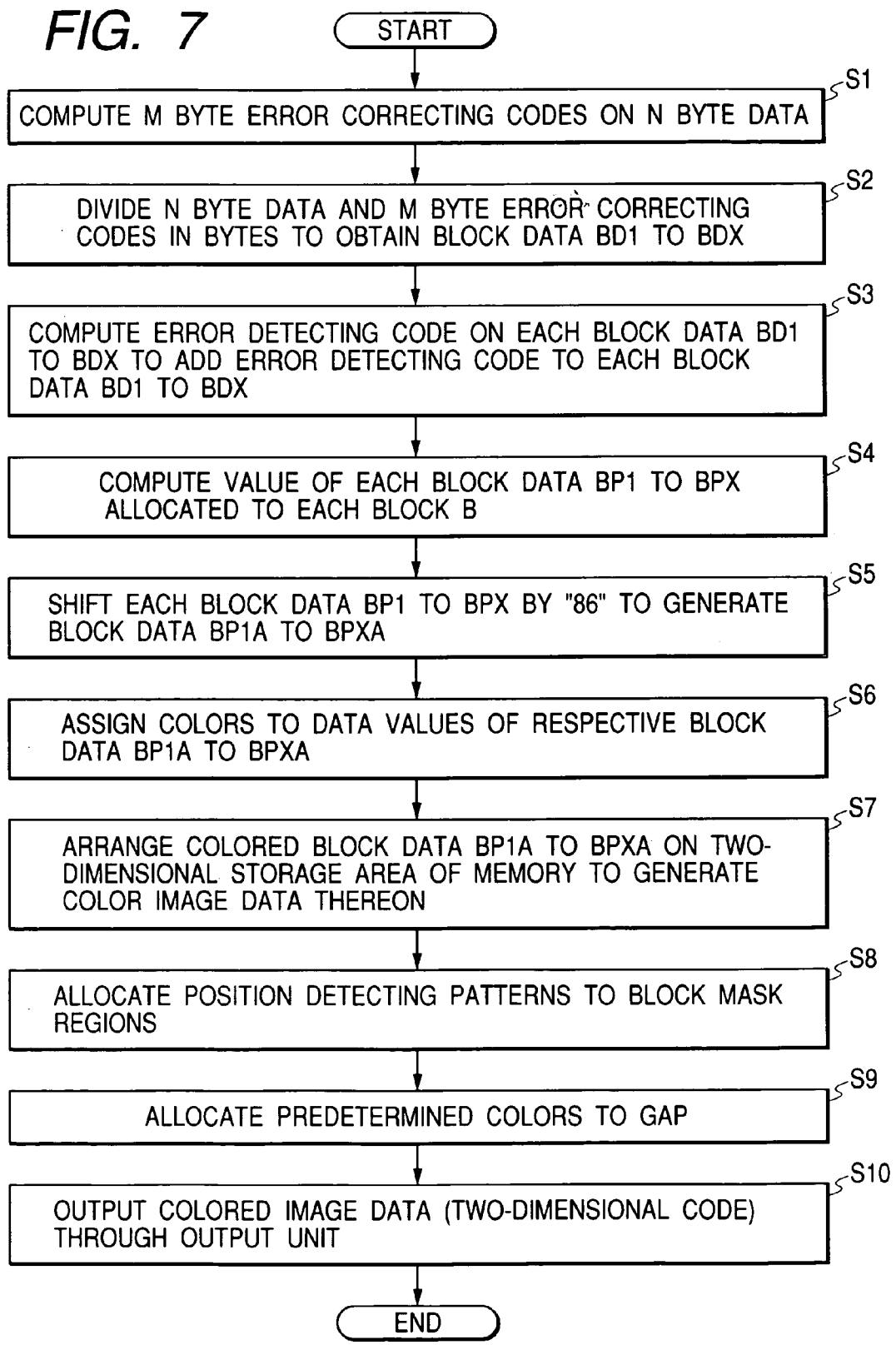
FIG. 7 is a flowchart illustrating the generating process of the control system shown in FIG. 5 according to the second embodiment.

In a case where the control system 8 generates the two-dimensional code 1 for representing information (data), such as N byte data D (see FIG. 6), the controller 8a computes M byte error correction codes EC based on the N byte data in accordance with one of known error correcting methods, such as Reed Solomon Method in Step S1 of FIG. 7. The error correction codes obtained by the Reed Solomon Method are referred to as "Reed Solomon codes" hereinafter.

Incidentally, the constant data value of (0, 1, 1, 0, 1, 0, 1, 0) corresponding to the data value of "86" in decimal may be added to each byte of the N byte data D.

The M byte error correction data, such as "Reed Solomon codes", can correct errors caused in a part of the N byte data with a predetermined probability of success which is determined by a predetermined error correction rate.

For example, in order to allow the M byte Reed Solomon codes as the M byte error correction codes to correct errors caused in the respective N/2 byte pieces of the N byte data, the number of M is two times as many as that of N/2, that is, the number of M is 2×N/2 that equals to N.

As described above, N byte Reed Solomon codes are required for correcting errors occurring in the respective N/2 byte pieces of the N byte data, and in this case, the number of all data is 2N bytes so that the error correction rate is set to (1/2N)/2N that equals to 25%.

Subsequently, in order to recode, for example, 1 byte (8 bits) data on each block B of the two-dimensional code 1, the controller 8a divides the N byte data D in bytes to obtain data D1~DN each of which comprises 1 byte (8 bits) data, and divides the M byte error correcting codes EC in bytes to obtain error correcting codes EC1~ECM each of which comprises 1 byte (8 bits) data in Step S2 of FIG. 7.

That is, in Step S2, the obtained data D1 to DN and the error correcting codes EC1 to ECM correspond to the blocks B of the two-dimensional code 1. Consequently, the data D1 to DN and the error correcting codes EC1 to ECM are referred to as "block data BD1 to BDX" hereinafter, wherein the number of "(N+M)" is replaced with that of "X" (see FIG. 6).

The controller 8a computes an error detecting code, such as a parity bit P, based on each of the block data BD1 to BDX to add the error detecting code (parity bit) P to each of the block data BD1 to BDX in Step S3 of FIG. 7. The process of the controller 8a in Step S3 obtains block data BP1 to BPX each of which comprises 9 bits (see FIG. 6).

As the parity bit P, either an even parity bit or an odd parity bit may be used. For example, the even parity bit is used to set the number of 1s of each of the block data BD1 to BDX to an even number.

Consequently, the controller 8a computes a value of each of the block data BP1 to BPX which is allocated to each of the blocks B in the data area 3 of the two-dimensional code 1 in Step S4 of FIG. 7.

For instance of the processing in Step S4, it is assumed that the data value of block data BD1 is represented by (0, 1, 1, 0, 1, 0, 1, 0) in order from the least significant bit "0" to the most significant bit "0" corresponding to the data value of "86" in decimal. In this case, the controller adds the even parity bit "0" to the 8 bit data (0, 1, 1, 0, 1, 0, 1, 0) to generate 9 bit data of (0, 1, 1, 0, 1, 0, 1, 0, 0) which is represented by the data value of "86" in decimal.

After the data values of the respective block data BP1 to BPX are calculated in Step S4, the controller 8a, as explained in the chapter (2) "Block structure of two-dimensional code", adds the constant value of "86" in decimal to each data value of each of the block data BP1 to BPX so as to shift each data value of 9 bit data of each of the block data BP1 to BPX by the constant value of "86", thereby generating block data BP1a to BPXa in Step S5 of FIG. 7 (see FIG. 6).

For example, if the block data BP1 to BPX represent a data value range from "0" in decimal to "511" in decimal are shifted to a data value range from "86" in decimal to "597" in decimal.

As described above, this shifting operation can prevent all of the cells of each block from being colored in white, which corresponds to "0" in decimal, and from being colored in black, which corresponds to "624" in decimal.

After the shifting operation in Step S5, the controller 8a, as explained in the chapter (2) "Block structure of two-dimensional code", converts the data values of the respective block data BP1a to BPXa in decimal to the substantially quinary strings each in which i-th bit from the end carries weight $5^i$, thereby assigning the corresponding colors to the bit values of each of the converted quinary strings in Step S6 of FIG. 7.

For example of the operation in Step S6, it is assumed that the data value of block data BP1a in decimal is represented by "86". In this case, the controller 8a converts the data value "86" into (1, 2, 3, 0) in the substantially quinary string so as to assign the colors of "red", "green", "blue", and "white" to the bits of data value (1, 2, 3, 0), respectively. As a result, the controller 8a generates a colored block data comprising a set of four colored cells to each of which one of the first to fifth colors is assigned (see FIG. 4C). Each of other block data BP2a to BPXa is also converted into colored block data comprising a set of four colored cells to each of which one of the first to fifth colors is assigned.

Then, the controller 8a arranges the colored block data BP1a to BPXa on a two-dimensional storage area 8e of the memory 8d in a predetermined arranging procedure, thereby generating color image data thereon in Step S7 of FIG. 7.

The size and addresses of the two-dimensional storage area 8e are set to correspond to the matrix size and the unit cells 4(1,1), ..., 4(26,26) of the two-dimensional code 1, and the matrix size of the two-dimensional code 1 is, for example, inputted to the controller 8a by the input unit 8b.

Figure 8:
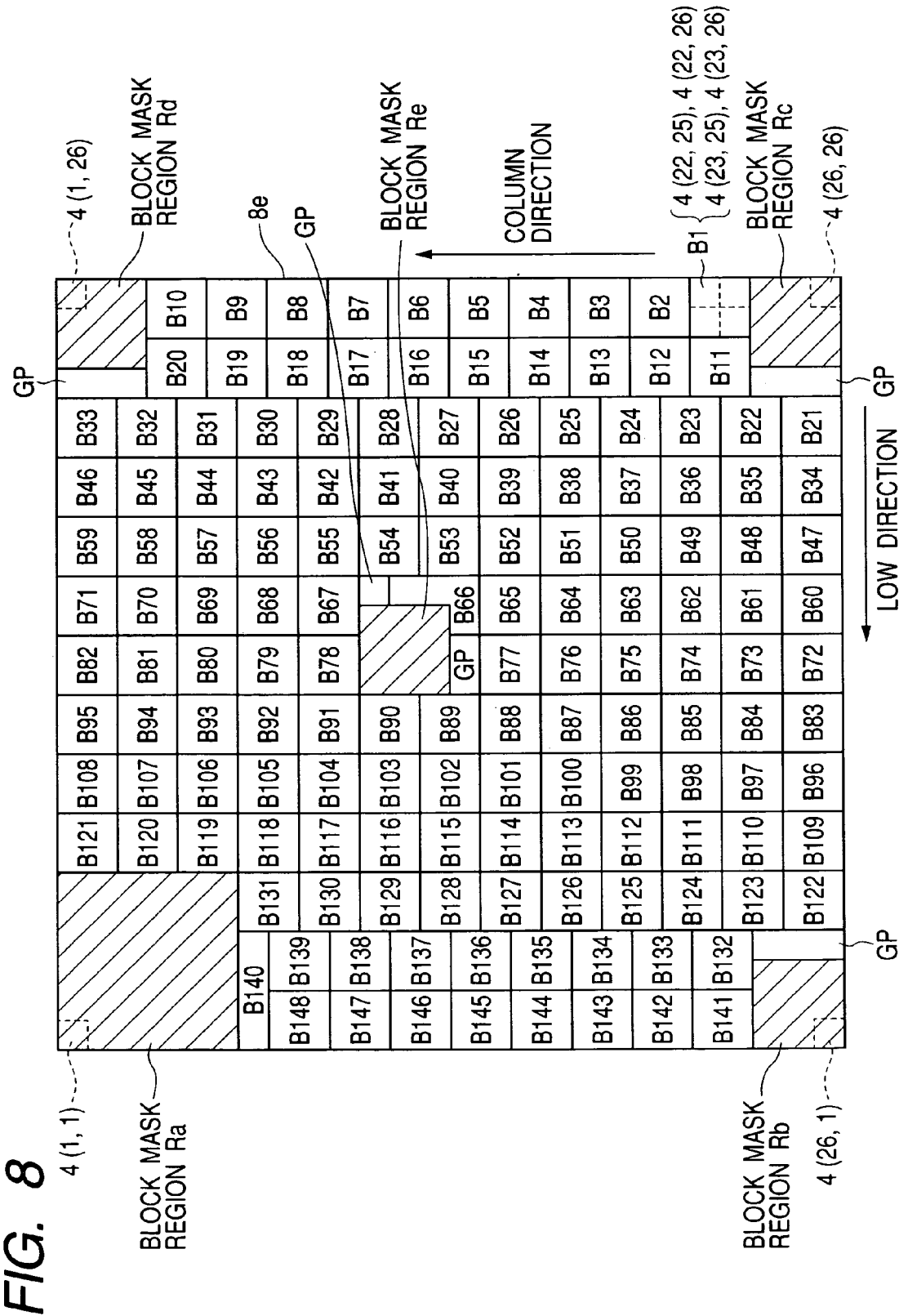
FIG. 8 is a view illustrating a two-dimensional storage area of a memory of the control system shown in FIG. 5 according to the second embodiment.

That is, as shown in FIG. 8, the addresses in the two-dimensional storage area 8e correspond to the labels 4(1,1), ..., 4(26,26) of the unit cells 4 of the two-dimensional code 1 shown in FIG. 1.

In the two-dimensional storage area 8e, block mask regions Ra to Re are previously determined. The block mask regions Ra to Re correspond to the first to fifth position detecting patterns 2a to 2e, respectively so that the controller 8a is adapted to avoid arrangements of any one of the block data BP1 to BPX on any one of the block mask regions Ra to Re.

Concretely, as an example of the processing in Step S6, the controller 8a sequentially arranges closely the colored block data (the set of four colored cells) BP1~the colored block data (the set of four colored cells) BPX (BP148 in the case of two-dimensional code 1) on the two-dimensional storage area 8e as the blocks B1~B148 from the bottom-right corner portion that is the addresses 4(22,25), 4(22,26), 4(23,25), 4(26,26) of the two-dimensional storage area in the column and row directions up to the top-left corner portion so as to avoid the block mask regions Ra to Re and not to be overlapped on other previously arranged blocks.

That is, as shown in FIG. 8, in a principal rule of the arranging procedure, the controller 8a, if possible, arranges the blocks each formed as a matrix on the two-dimensional storage area 8e. For example, the matrix shaped blocks B1 to B65, B67 to B139, and B141 to B148 are arranged on the area 8e. The controller 8a, if not possible, deforms at least one of remains of the blocks to arrange it on the two-dimensional storage area 8e, for example, the blocks B66 and B140.

Subsequently, as explained in the chapter (1-1) "An example of the two-dimensional codes according to the first embodiment", the controller 8a allocates the position detecting patterns 2a to the block mask region Ra. Similarly, the controller 8a allocates the position detecting patterns 2b to 2e to the block mask regions Rb to Re, respectively, in Step S8 of FIG. 7.

Then, if gap addresses GP on which no blocks are arranged are left among the adjacent blocks (see FIG. 8), the controller 8a allocates predetermined colors to the gap addresses GP, respectively, in Step S9 of FIG. 7.

As described above, on the two-dimensional storage area 8e, the color image data comprising the colored blocks B1 to B148 and the position detecting patterns 2a to 2e is obtained as the two-dimensional code 1 shown in FIG. 1.

Then, if need arises, the controller 8a outputs the colored image data (the two-dimensional code 1) through the output unit 8c in Step S10 of FIG. 7. Specifically, when the output unit 8c includes the printer, the printer prints the colored image data transmitted from the controller 8a on a sheet of paper or other similar media, and if the output unit 8c includes the display, the display outputs the image corresponding to the two-dimensional code 1 on its screen.

Other two-dimensional codes 1b1, 1b2, 5 to 7 according to the first embodiment can be generated in the substantially same manner as the two-dimensional code 1.

As described above, the control system 8 can generate the two-dimensional code 1 comprising the blocks B each consisting of the colored four unit cells 4, and each of the blocks B can indicate the predetermined data range corresponding to a block of nine cells (nine bits).

(4) Reading Process of the Two-dimensional Code (4-1) Structure of Reading apparatus Next, the reading process of the above two-dimensional codes 1, 5 to 7 and so on according to a third embodiment of the present invention will be described hereinafter with reference to FIGS. 9 and 10. In this third embodiment, in order to simplify the explanation of the generation process, the reading process of the two-dimensional code 1 will be described as an example.

Figure 9:
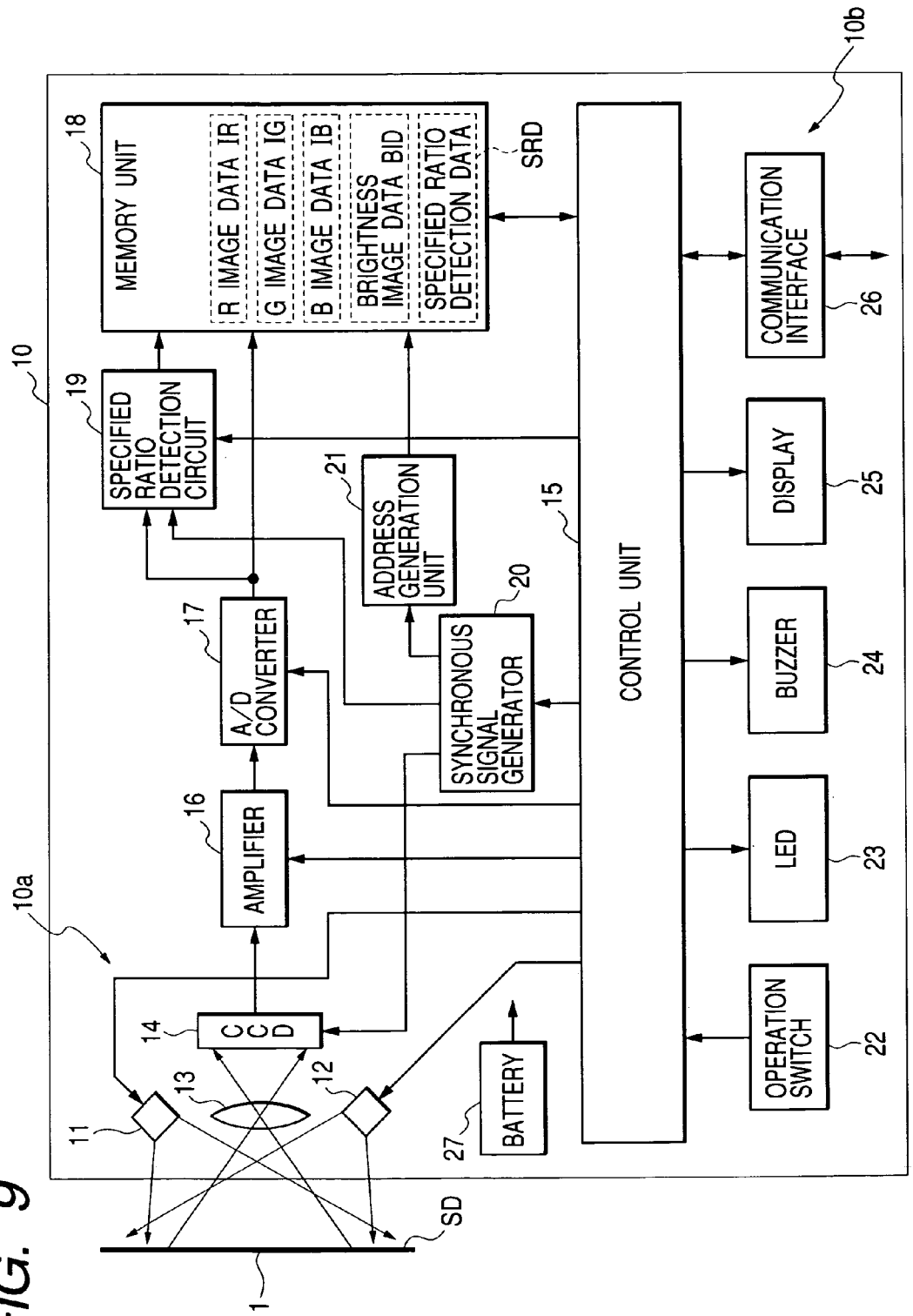
FIG. 9 is a diagram illustrating an electrical circuit diagram of a reading apparatus for reading the two-dimensional codes related to the first embodiment according to a third embodiment of the present invention.

FIG. 9 illustrates an electrical circuit diagram of a reading apparatus 10 for reading the two-dimensional code 1 according to the third embodiment of the invention.

The reading apparatus 10 can be configured as a handheld device, a stationary device or the like. The reading apparatus 10 comprises an optical reading unit 10a and a data processing unit 10b electrically connected to the reading unit 10a.

The optical reading unit 10a is provided with light emitting devices (LEDs) 11 and 12 that irradiate white light on a data recording surface SD of label or the like on which the two-dimensional code 1 as an object for reading is written or printed. The LEDs 11 and 12 individually irradiate the white light from different directions with respect to the data recording surface SD.

The optical reading unit 10a is also provided with a lens 13 disposed to be opposite to the two-dimensional code 1, and a CCD (Charge Coupled Device) sensor 14. The CCD sensor 14 is disposed to be opposite to the lens 13 so that the lens 13 is interposed between the two-dimensional code 1 and the CCD sensor 14.

The data processing unit 10b comprises a control unit 15 including a computer having a combination of a CPU (Central Processing Unit), an internal memory unit including a ROM (Read Only Memory), a RAM (Random Access Memory) and the like, and an interface. The control unit 15 operates in accordance with a program for reading process stored on the internal memory unit. The program for reading process can be loaded from an external memory, such as a CD (Compact Disk)-ROM.

The data processing unit 10b also comprises an amplifier 16 electrically connected to an output terminal of the CCD sensor 12 and the control unit 15. The data processing unit 10b comprises an A/D (analog/digital) converter 17 electrically connected to an output terminal of the amplifier 16 and the control unit 15, and a memory unit 18 electrically connected to an output terminal of the A/D converter 17 and the control unit 15.

The data processing unit 10b comprises a specified-ratio detection circuit 19 electrically connected to the output terminal of the A/D converter 17 and the control unit 15, and an output terminal of the specified ratio detection circuit 19 is electrically connected to the memory 18.

The data processing unit 10b includes a synchronous signal generator 20 electrically connected to the CCD sensor 14, the control unit 15, and the specified-ratio detection circuit 19. The data processing unit 10b also includes an address generation circuit 21 electrically connected to the synchronous signal generator 20 and the memory unit 18.

Furthermore, the data processing unit 10b comprises an operation switch 22, an LED (Liquid Crystal Display) 23, a buzzer 24, a display 25, such as a liquid-crystal display, and a communication interface 26, each of which is electrically connected through the interface of the control unit 15 thereto.

As the CCD sensor 14, a single CCD sensor or 3CCD sensor or the like can be used.

The CCD sensor 14 comprises a plurality of photodiodes representing pixels and arranged in parallel horizontal lines (main scanning lines) of the CCD sensor 14 and in parallel vertical lines (sub scanning lines) thereof.

The CCD sensor 14 also comprises a color filter unit and a transfer portion.

That is, the CCD sensor 14 receives by each of the photodiodes (pixels) the light waves from the data recording surface SD through the lens 13 and the color filter portion to convert the received light waves into a color image signal composed of three separate RGB image signals each of which captured by each of the pixels. The RGB image signals represent a color image of the data recording surface D.

The CCD sensor 14 sequentially transfers by the transfer portion the RGB image signals in response to the synchronous pulse signals transmitted from the synchronous signal generator 20.

The RGB image signals transferred by the CCD sensor 14 are sequentially inputted to the amplifier 16.

The amplifier 16 amplifies the inputted RGB image signals at a gain based on a gain control signal transmitted from the control unit 15 to output the amplified RGB signals to the A/D converter 17.

The A/D converter 17 receives the RGB image signals to convert them into digital signals (binary signals) in accordance with the synchronous pulse signal fed from the synchronous signal generator 20. Each of the digitized RGB image signals comprises n-bit data each having one of two discrete levels one level of which corresponds to logic 1 (true), and other level of which corresponds to logic 0 (false). The R (red) digital signal, the G (green) digital signal, and the B (blue) digital signal are stored on the memory unit 18 as R (red) image data IR, G (green) image data IG, and B (blue) image data IB.

The synchronous signal generator 20 produces the synchronous pulse signals to periodically output the synchronous pulse signals to the CCD sensor 14, the specified ratio detection circuit 19, and the address generation circuit 21 according to the basis of the control signals fed from the control unit 15.

The address generation unit 21 counts pulses in a number of the transmitted synchronous pulse signals to generate address signals in response to the count result, thereby outputting the address signals to the memory unit 18.

That is, the R image data IR, the G image data IG, and the B image data IB are stored on the memory unit 18 in response to the outputted address signals of the addresses in the memory unit 18, which correspond to the pixels of the CCD sensor 14, respectively.

The specified-ratio detection circuit 19 obtains brightness image data BID on the basis of the R image data IR, the G image data IG, and the B image data IB. The brightness image data BID represents the level of brightness in each pixel of the colored image data.

That is, if each of the R image data IR, the G image data IG, and the B image data IB is digitized as 8-bit data, the region of brightness image data BID is represented as gray scale image data having, for example, two gray levels, such as brightness level and darkness level.

The brightness level is the level of "white", which corresponds to the 8-bit data of (1,1,1,1,1,1,1,1), and the darkness level the level of each of colors "black", "red", "blue", and "green", which corresponds to the 8-bit data of (0,0,0,0,0,0,0,0).

In addition, the specified-ratio detection unit 19 includes state change detectors which sense every state change from "the brightness level" to "darkness level" in each pixel of the brightness image data BID and every state change from "darkness level" to "brightness level" in each pixel of the brightness image data BID.

The specified-ratio detection unit 19 includes a first counter for counting a number of synchronous pulse signals every time interval between the moment of the occurrence of a state change from "darkness level" to "brightness level" and the moment of the occurrence of a following state change from "brightness level" to "darkness level". The count result of the number of pulse signals of the first counter indicates, for example, the length of continuous brightness potion having the brightness level in the brightness image data BID.

The specified-ratio detection unit 19 includes a second counter for counting a number of synchronous pulse signals every time interval between the moment of the occurrence of a state change from "brightness level" to "darkness level" and the moment of the occurrence of a following state change from "darkness level" to "brightness level". The count result of the number of pulse signals of the second counter indicates, for example, the length of continuous darkness potion having the darkness level in the brightness image data BID.

The specified-ratio detection unit 19 also comprises a divider or calculator that computes the ratio in length between the continuous brightness portion and the continuous darkness portion in response to an output signal from the first counter and an output signal from the second counter. The divider or calculator generates and outputs a signal representing the ratio in length between the continuous brightness portion and the continuous darkness portion. The specified-ratio detection unit 19 includes a comparator which determines whether ratios sequentially represented by the output signal from the divider or calculator are equal to or different from reference ratios corresponding to the position detecting patterns 2a to 2e in the two-dimensional code 1. The reference ratios, for example, are transmitted from the control unit 15. The comparator outputs the specified ratio detection data SRD representing the compared result of the comparator to the memory unit 18, and the specified ratio detection data SRD is stored on the memory unit 18.

If the region of brightness image data BID is represented as gray scale image data having three or more gray levels, the specified-ratio detection unit 19 can obtain a signal representing the ratio in length between the continuous brightness portion colored in "white" and the continuous darkness portion colored in other colors in "black", "blue", "red", and "green" according to the differences between the brightness levels of the "white" and each of the "black", "blue", "red", and "green".

Incidentally, as another example of the specified ratio detection unit 19, U.S. Pat. No. 6,678,412 teaches a brightness comparator, a darkness comparator, a bright-dark judging unit, a counter, and so on, the disclosure of which is incorporated totally herein by reference.

In addition, an operator can operate the operation switch 22 to input a command to start a two-dimensional code reading and decoding process, and various items of information to the control unit 15. The LED 23 is designed for 2-scale (2-tone) indication of information sent from the control circuit 15. The LED 23, the buzzer 24 and the display 25 can indicate control state of the control unit 15 and/or operate to allow the operator to notice information. The communication interface 26 allows the control unit 15 to communicate with external devices.

On the other hand, the reading apparatus 10 comprises a battery 27 used as a power supply for activating the above electric units, devices, and circuits in the reading apparatus 10.

(4-2) Explanation of Reading Process of the Reading Apparatus

When starting the reading and decoding process to the two-dimensional code 1, the control unit 15 executes the program stored on the internal memory unit.

That is, the control unit 15 transmits the control signals to the LEDs 11 and 12, thereby making them irradiate the white light to the data recording surface SD. The control unit 15 transmits the control signal to the CCD sensor 14 so that the CCD sensor 14 captures the color image composed of the RGB signals of the data recording surface SD including the two-dimensional code 1 in Step S20 of FIG. 10.

The RGB signals are transmitted through the amplifier 16 to the A/D converter 17 so that the RGB signals are converted into the R image data IR, the G image data IG, and the B image data IB in accordance with the synchronous pulse signals fed from the synchronous signal generator 20. The R image data IR, the G image data IG, and the B image data IB are stored on the different storage areas of the memory unit 18 in response to the outputted address signals of the addresses in the memory unit 18. That is, the R image data IR, the G image data IG, and the B image data IR captured by each pixel of the CCD sensor 14 are stored on the memory unit 18.

Simultaneously, the R image data IR, the G image data IG, and the B image data IB are transmitted to the specified ratio detection unit 19 so that the specified ratio detection unit 19 obtains the specified ratio detection data SRD on the basis of the image data IR, IG, and IB. The specified ratio detection unit 19 outputs the specified ratio detection data SRD to the memory unit 18 so that the specified ratio detection data SRD is stored on the memory unit 18.

Figure 10:
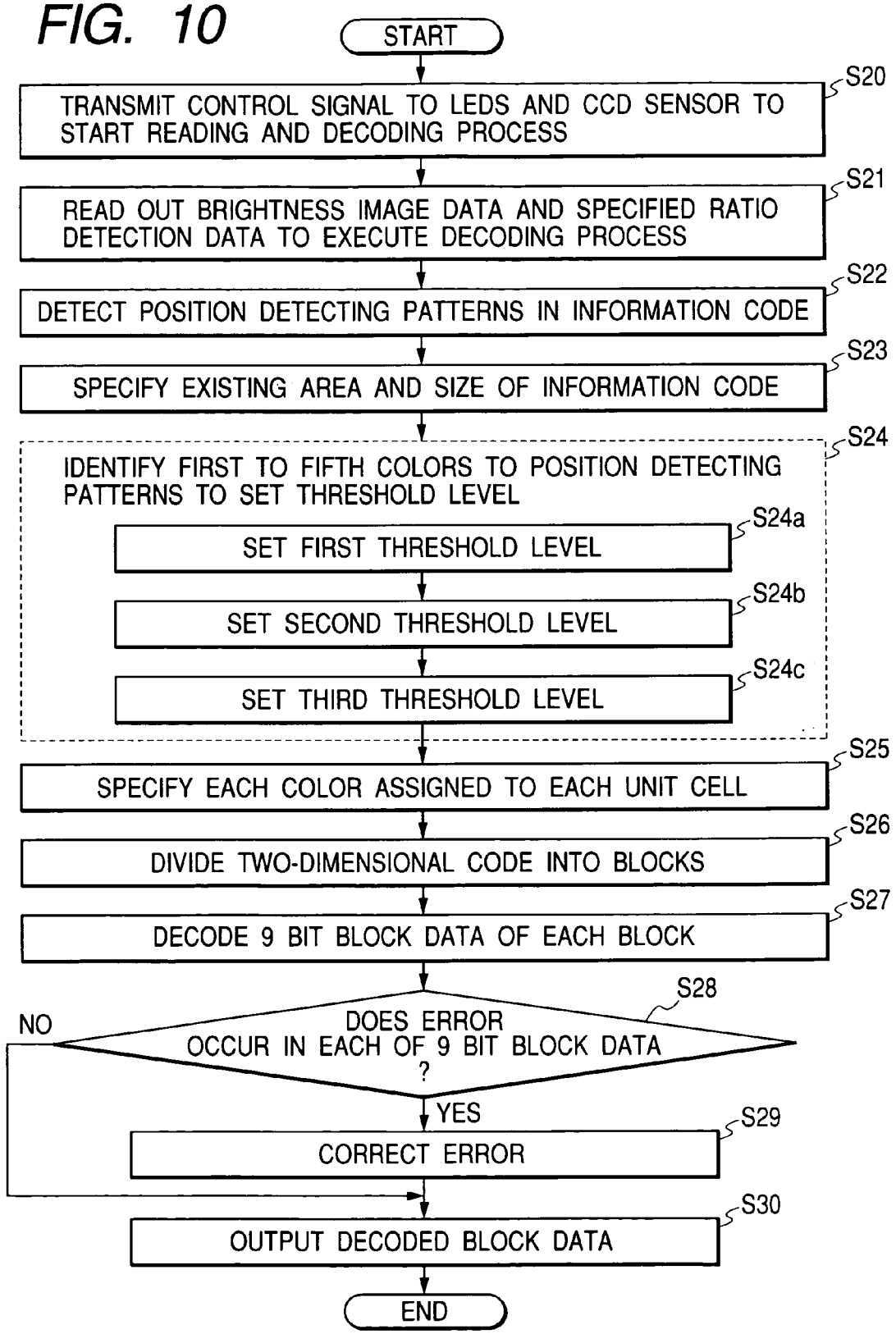
FIG. 10 is a flowchart illustrating the generating process of the reading apparatus shown in FIG. 9 according to the third embodiment.

Then, the control unit 15 reads out the brightness image data BID and the specified ratio detection data SRD from the memory unit 18 in Step S21 of FIG. 10, and executes decoding process of the two-dimensional code 1.

That is, the control unit 15 detects the position detecting patterns 2a to 2e in the two-dimensional code 1 on the basis of the brightness image data BID and the specified ratio detection data SRD in Step S22 of FIG. 10.

As the process in the Step S22, the control unit 15 searches the specified ratio detection data SRD to detect that the ratio in length between the continuous brightness portion and the continuous darkness portion equals to one of the reference ratios of "1(darkness): 1(brightness): 3(darkness) 1(brightness): 1(darkness)", and "1(darkness): 1(brightness): 1(darkness)".

That is, as shown in FIG. 1A, the ratio in length among the white and black portions of the position detecting pattern 2a remains equal to one of the reference ratios of "1(darkness): 1(brightness): 3(darkness) 1(brightness): 1(darkness)" independent of the scanning lines of the CCD sensor 14 to the two-dimensional code 1. Namely, even if the main scanning line direction of the CCD sensor 14 against the two-dimensional code 1 crosses the center portion of the position detecting pattern 2a at any angle with respect to the column direction (or the row direction) of the two-dimensional code 1, the ratio in length among the white and black portions of the position detecting pattern 2a is constant. That is, the ratio in length among the white and black portions of the position detecting pattern 2a is independent of any angle of the scanning line direction with respect to the column direction (or the row direction) of the two-dimensional code 1.

Similarly, as shown in FIG. 1A, the ratio in length among the white and black portions of each of the position detecting patterns 2b to 2e remains equal to other of the reference ratios of "1(darkness): 1(brightness): 1(darkness)" independent of the scanning lines of the CCD sensor 14 to the two-dimensional code 1. Namely, even if the scanning line direction of the CCD sensor 14 to the two-dimensional code 1 crosses the center portion of each of the position detecting patterns 2a to 2e at any angle with respect to the column direction (or the row direction) of the two-dimensional code 1, the ratio in length among the white and black portions of each of the position detecting patterns 2a to 2e is constant. The ratio in length among the white and black portions of each of the position detecting patterns 2a to 2e is independent of any angle of the scanning line direction with respect to the column direction (or the row direction) of the two-dimensional code 1.

Subsequently, to Step S22, the control unit 15 specifies the existing area of the two-dimensional code 1 and the size of the two-dimensional code 1, such as (26 cells×26 cells) according to the relative positional relationships between the position detecting patterns 2a to 2e in Step S23 of FIG. 10.

Next, the control unit 15 identifies the first color (white), the second color (black), the third color (red), the fourth color (blue), and the fifth color (green) allocated to at least one of the position detecting patterns 2a to 2e according to the size of the two-dimensional code 1, thereby setting a threshold level for determining each color assigned to each unit cell 4 in the data area 3 in Step S24 of FIG. 10. The process of the control unit 15 in Step S24 will be described hereinafter in detail.

Figure 11:
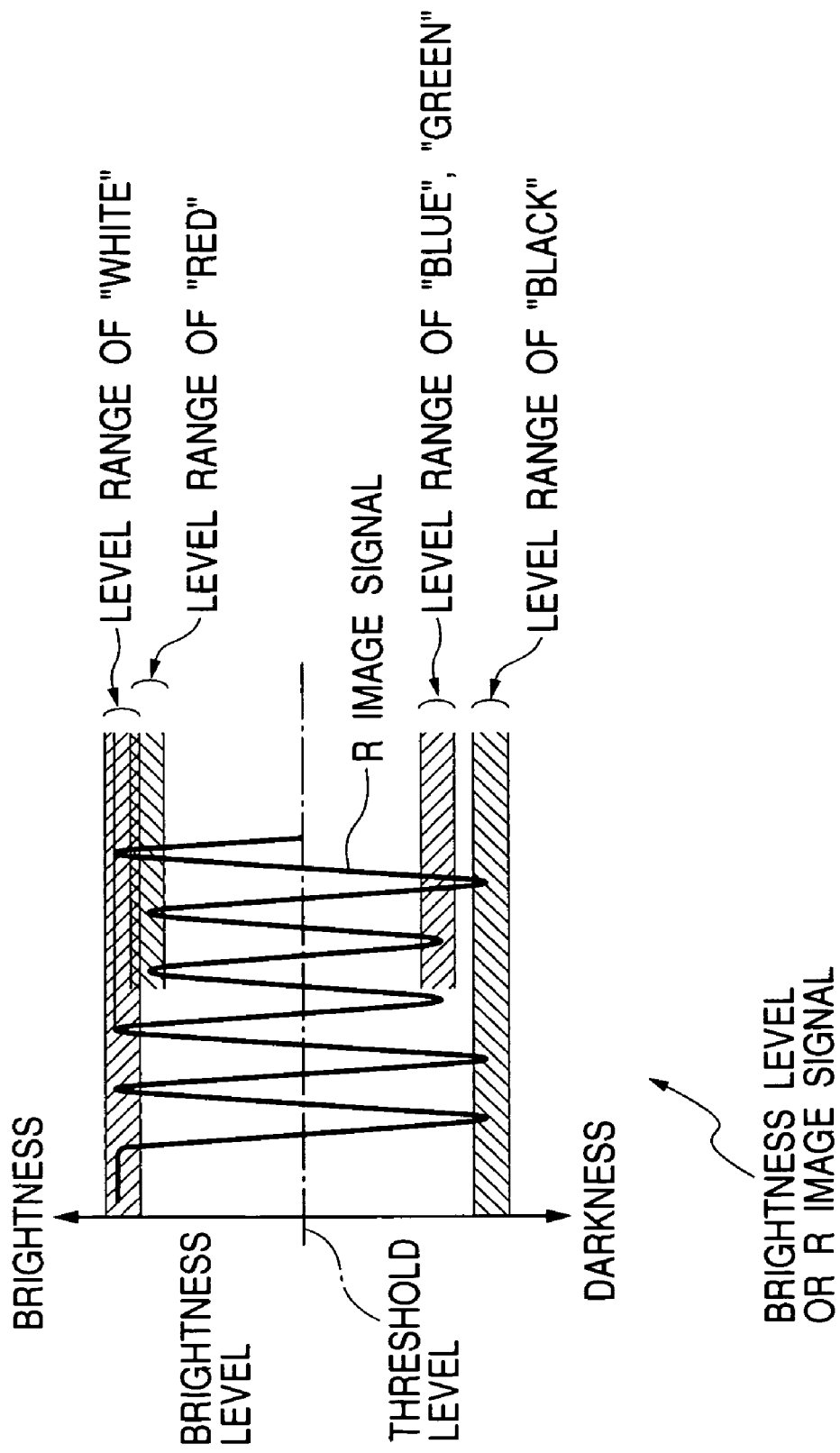
FIG. 11 is a view illustrating a waveform of an R image signal outputted from a CCD sensor and inputted to an A/D converter of the reading apparatus shown in FIG. 9 according to the third embodiment.

FIG. 11 shows the waveform of the R image signal outputted from the CCD sensor 14 and inputted to the A/D converter 17.

In order to produce the digitized RGB image data IR, IG, and IB, the A/D converter 17 needs to identify the brightness levels of the RGB image signals. As shown in FIG. 11, in the brightness level of the R image signal, the "red color" and "white color" have substantially high brightness levels that are approximately equal to each other so that each of the brightness levels of the "red color" and "white color" corresponds to "brightness". In contrast, the "black color", "green color" and "blue color" have substantially low brightness levels that are approximately equal to each other so that each of the brightness levels of the "black color", "green color" and "blue color" corresponds to "darkness".

Similarly, in the brightness level of the G image signal, each of the brightness levels of the "green color" and "white color" corresponds to "brightness", and each of the brightness levels of the "black color", "red color" and "blue color" corresponds to "darkness". In addition, in the brightness level of the B image signal, each of the brightness levels of the "blue color" and "white color" corresponds to "brightness", and each of the brightness levels of the "black color", "red color" and "green color" corresponds to "darkness".

Therefore, using the above relationships among the brightness levels of the RGB image signals allows the control unit 15 to determine which color is assigned to each unit cell 4.

That is, if all of the brightness levels of the R image data IR, the G image data IG, and the B image data IB obtained from the same unit cell 4 are "brightness", the control unit 15 determines that the color assigned to the unit cell 4 is "white". If all of the brightness levels of the R image data IR, the G image data IG, and the B image data IB obtained from the same unit cell 4 are "darkness", the control unit 15 determines that the color assigned to the unit cell 4 is "black".

In addition, if one of the brightness levels of the R image data IR, the G image data IG, and the B image data IB obtained from the same unit cell 4 is "brightness", the control unit 15 determines that the color assigned to the unit cell 4 is one of the red, green, and blue which corresponds to the color of "brightness".

That is, if the brightness level of the R image data IR is only "brightness", the control unit 15 determines that the color assigned to the unit cell 4 is "red". If the brightness level of the B image data IB is only "brightness", the control unit 15 determines that the color assigned to the unit cell 4 is "blue", As described above, if the control unit 15 determines whether all brightness levels of the R image data IR, the G image data IG, and the B image data IB obtained from each of the unit cells 4 are "brightness" or "darkness", the control unit 15 can securely determine which color is assigned to each of the unit cell 4.

Then, the control unit 15 sets a first threshold level. The first threshold level is intermediate between the brightness level of at least one of the "white color" or the "red color" and that of at least one of the "black color", "green color" and "blue color" based on the RGB image data IR, IG, and IB of the patterns 2a to 2e in Step S24a of FIG. 10. The first threshold level allows the control unit 15 to determine some unit cells 4 to each of which the red color is assigned.

Similarly, the control unit 15 sets a second threshold level. The second threshold level is intermediate between the brightness level of at least one of the "white color" or the "green color" and that of at least one of the "black color", "red color" and "blue color" by the RGB image data IR, IG, and IB of the patterns 2a to 2e in Step S24b of FIG. 10. The second threshold level allows the control unit 15 to determine some unit cells 4 to each of which the green color is assigned.

Furthermore, the control unit 15 sets a third threshold level. The third threshold level is intermediate between the brightness level of at least one of the "white color" or the "blue color" and that of at least one of the "black color", "red color" and "green color" based on the RGB image data IR, IG, and IB of the patterns 2a to 2e in Step S24c of FIG. 10. The third threshold level allows the control unit 15 to determine some unit cells 4 to each of which the blue color is assigned.

Subsequently, to Step S24, the control unit 15 determines which color is assigned to each unit cell 4 in the data area 3 according to the first, second, and third threshold levels obtained in Step S24. The control unit 15 specifies each color assigned to each unit cell 4 in the data area 3 according to the determination result in Step S25 of FIG. 10.

Figure 12:
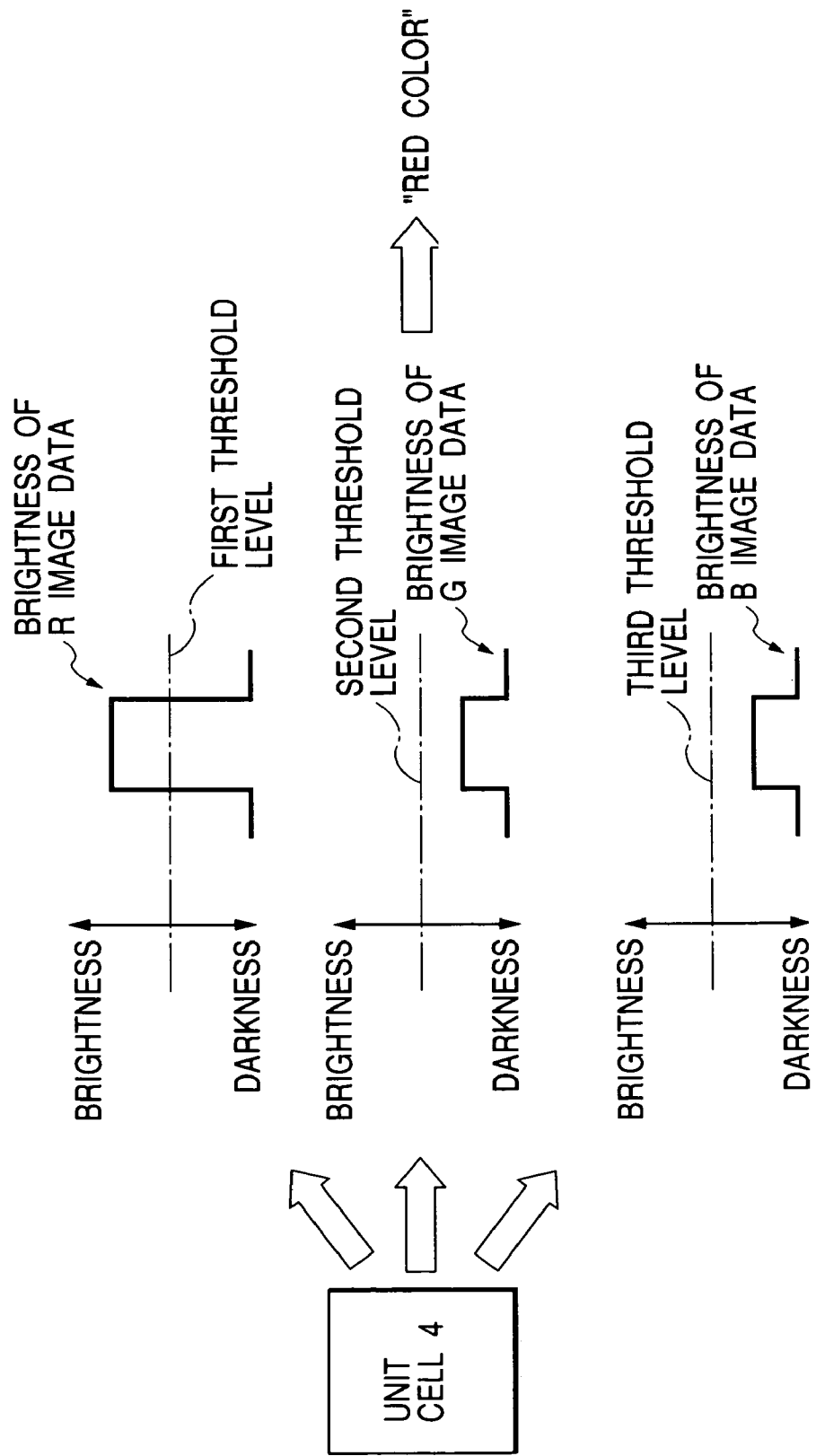
FIG. 12 is a view illustrating an example of specifying process in Step S25 of the FIG. 11's flowchart according to the third embodiment.

For example, if the brightness level of the R image data IR obtained from the unit cell 4 is higher than the first threshold level, and each of the brightness levels of the G image data IG and B image data IB obtained from the same unit cell 4 is lower than the respective second and third threshold levels, the control unit 15 specifies that the color of the unit cell 4 is "red" (see FIG. 12).

Then, the control unit 15 divides the two-dimensional code 1 into the previously set blocks B, such as the blocks B1 to B148 shown in FIG. 3 in Step S26 of FIG. 10. Next, the control unit 15 decodes the 9 bit block data BP1 to BP148 set to the respective blocks B1 to B148 according to the colors assigned to the unit cells 4 of the respective blocks B1 to B148 in Step S27 of FIG. 10.

For example, as explained in the chapter (2) "Block structure of two-dimensional code", assuming that one of the blocks B1 to B148 is colored like the block B shown in FIG. 4C, the control unit 15 computes the data value (1, 3, 3, 2) to decodes the 9 bit block data corresponding to the data value "255" in decimal.

Simultaneously or sequentially to Step S27, the control unit 15 checks whether error occurs in each of the 9 bit block data BP1 to BP148 on the basis of the error detecting code P added to each of the 9 bit block data BP1 to BP148 in Step S28 of FIG. 10.

Specifically, in cases where the even parity bit P is added to at least one of the 9 bit block data BP1 to BP148, the control unit 15 computes the number of is in at least one of the 9 bit block data BP1 to BP148 to determine whether the computed number is an even number.

If the check result of the determination in Step S28 is YES, that is, the computed number of at least one of the 9 bit block data BP1 to BP148 is not an even number, the control unit 15 executes error correction process. That is, the control unit 15 corrects error occurring in the at least one of the block data BP1 to BP148 according to the error correcting codes EC corresponding to the at least one of the block data BD1 to BD148 in Step S29 of FIG. 10.

Then, if the error detecting process, and, if need arises, the error correcting process have already been completed with respect to all block data BP1 to BP148, the control unit 15 outputs the decoded block data BD1 to BD148, that is, the N byte data D, through the display 25 or the like in Step S30 of FIG. 10.

Other two-dimensional codes 1b1, 1b2, 5 to 7 can be read out and decoded in the substantially same manner as the two-dimensional code 1.

As another process of finding the position detecting patterns 2a to 2e, the U.S. Pat. No. 5,764,798 teaches prioritized searching methods for finding coded symbols corresponding to the position detecting patterns 2a to 2e by setting search lines of various directions, the disclosure of which is totally incorporated herein by reference.

As described above, the reading apparatus 10 of this third embodiment can detect rapidly accurately the existing area and the size of the two-dimensional code 1 according to the specified positions of the position detecting patterns 2a to 2e. In addition, the reading apparatus 10 can identify every color assigned to the position detecting patterns 2a to 2e based on the size of the two-dimensional code 1, and set the first to third threshold levels for specifying every color assigned to every unit cell 4 in the data area 3.

Accordingly, the reading apparatus 10 can specify every color allocated to every unit cell 4 in the data area 3 based on the first to third threshold levels, thereby reading out pieces of information (data) stored on the two-dimensional code 1.

(5) Division Display Process of the Two-dimensional Code

Next, the division display process of the above two-dimensional codes 1, 1b1–1b2, 5 to 7 and so on according to a fourth embodiment of the present invention will be described hereinafter with reference to FIGS. 13 to 15. In this fourth embodiment, in order to simplify the explanation of the division display process, the division display process of the two-dimensional code 1 will be described as an example.

Figure 13:
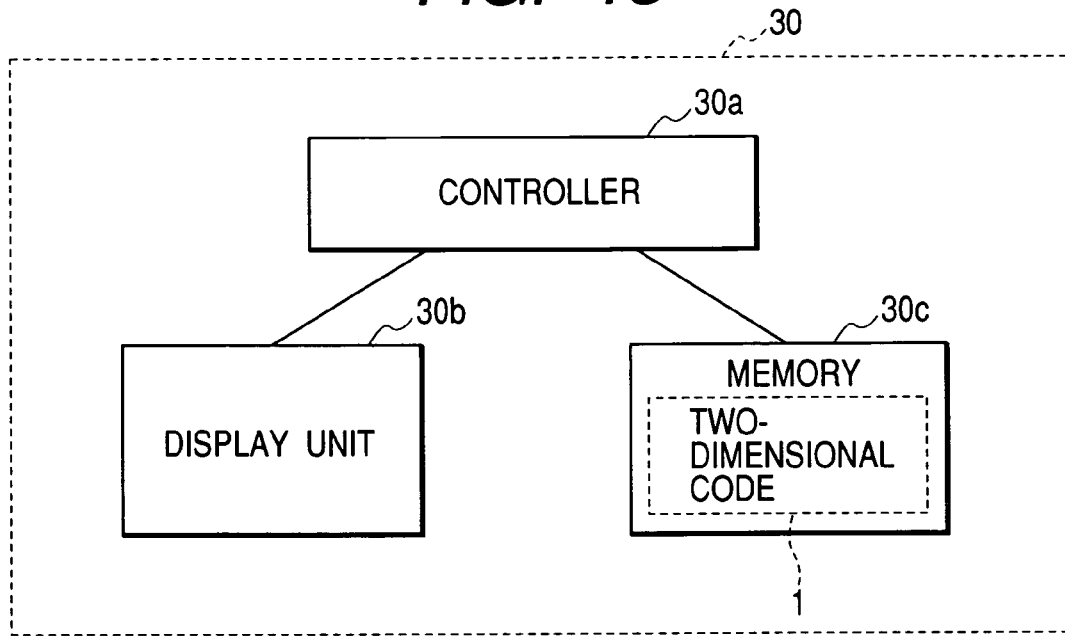
FIG. 13 is a block diagram illustrating a control system as a display apparatus for displaying divisionally two-dimensional codes related to the first embodiment according to a fourth embodiment of the present invention.

FIG. 13 illustrates a control system 30 as a display apparatus for displaying divisionally the two-dimensional code 1. The control system 30 comprises a controller 30a, a display unit 30b, and a memory 30c, and so on, and they are electrically connected to each other. As the control system 30, a computer system can be applied.

The display unit 30b is operative to display image data transmitted from the controller 30a on its screen.

In a case where the size of the two-dimensional code 1 is large, and the screen area of the display unit 30b for displaying the two-dimensional code 1 is limited, the controller 30a executes a division display process described hereinafter to display efficiently the two-dimensional code 1.

If the screen area of the display unit 30b is narrow so that it is difficult to display all unit cells 4 of the two-dimensional code 1 at once, the controller 30a displays divisionally the two-dimensional code 1.

That is, the controller 30a sets a number of unit cells 4, which the display unit 30b can display on its screen, with respect to the original number of the unit cells 4 of the two-dimensional code 1. Next, the controller 30a determines a number of division of the two-dimensional code 1 that corresponds to the set number of unit cells 4 in Step S40 of FIG. 14. In this fourth embodiment, the number of division is set to "four".

Subsequently, to Step S40, the controller 30a divides the data stored on the two-dimensional code 1 into four pieces of data in a predetermined division order, and sets the display order of the four pieces of data in Step S41 of FIG. 14.

Figure 14:
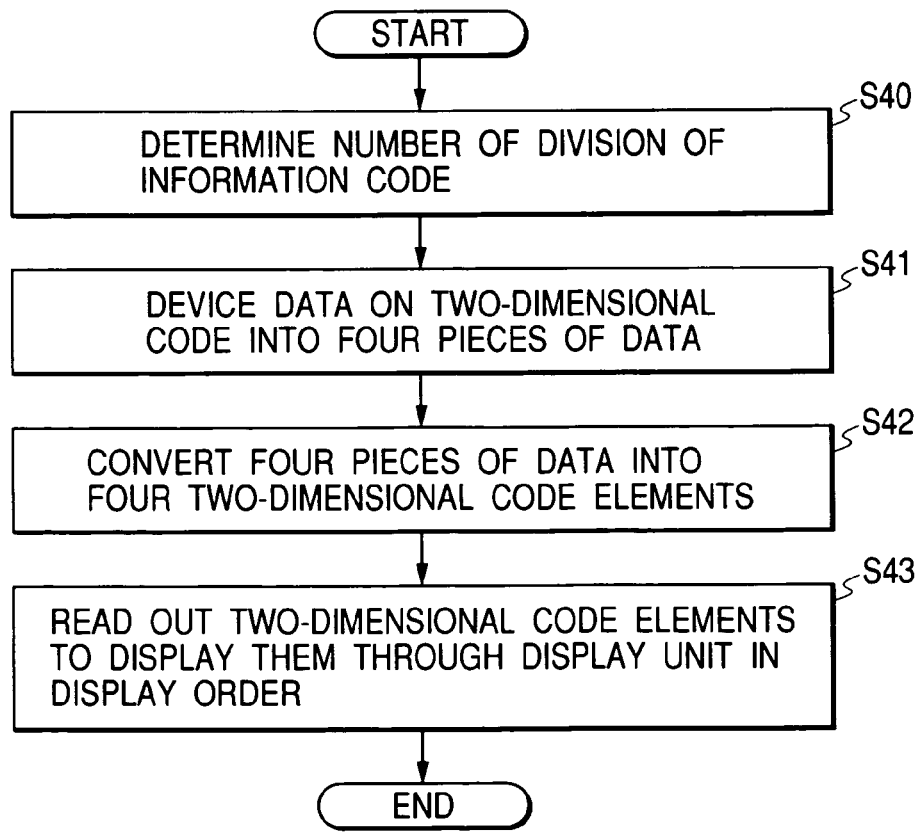
FIG. 14 is a flowchart illustrating the displaying process of the control system shown in FIG. 13 according to the fourth embodiment.

Next, the controller 30a converts the four pieces of data into four two-dimensional code elements 1K1 to 1K4, respectively, in Step S42 of FIG. 14, which is substantially the same process shown in FIG. 7. The two-dimensional code elements 1K1 to 1K4 are stored on the memory 30c. To the set of two-dimensional code elements K1 to K4, the display order is determined in correspondence with the division order so that the two-dimensional code elements K1, K2, K3, and K4 are displayed in this order.

Figure 15:
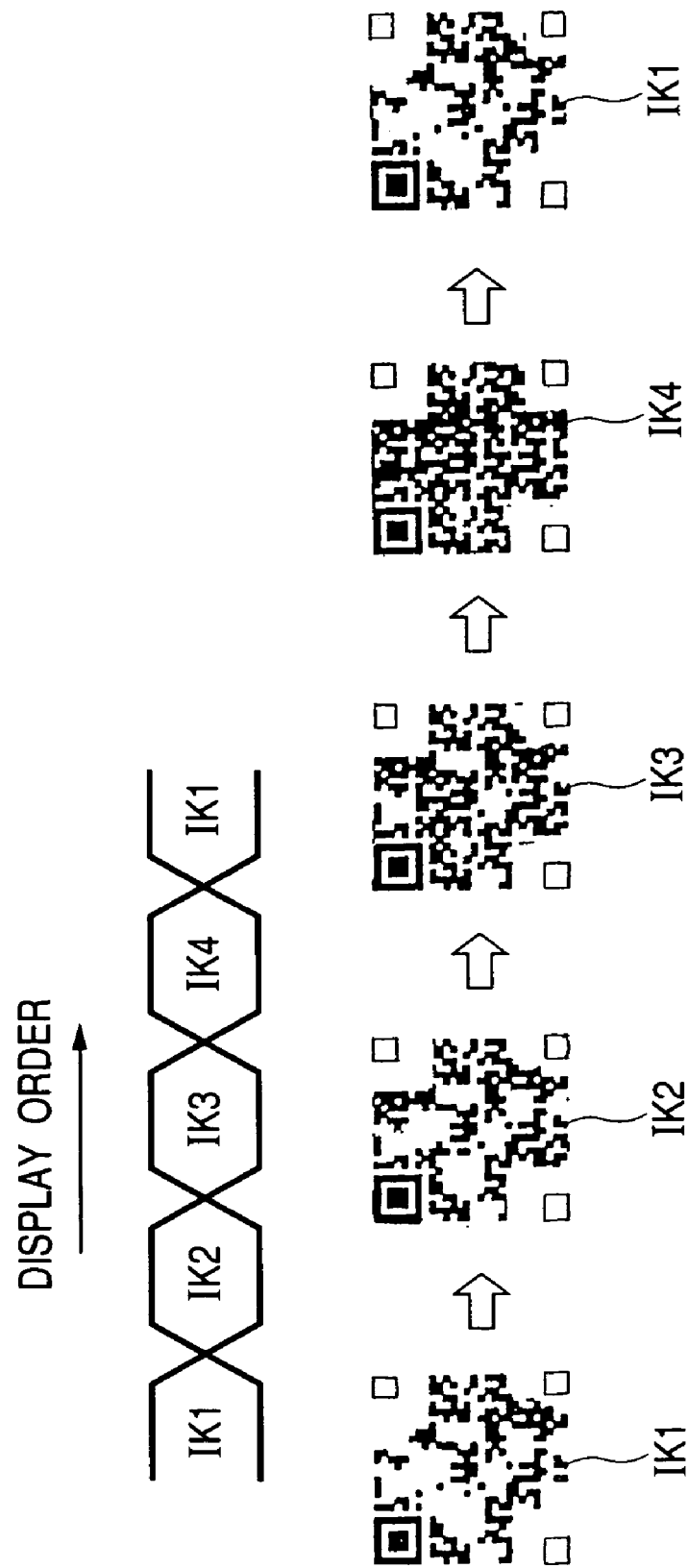
FIG. 15 is a view illustrating an example of reading out and displaying process in Step S33 of the FIG. 14's flowchart according to the fourth embodiment.

When displaying the two-dimensional code elements K1 to K4, the controller 30a reads out the two-dimensional code elements K1 to K4 in the display order at predetermined intervals to display switchably them through the display unit 30c in the display order at predetermined intervals in Step S43 of FIG. 14 (see FIG. 15).

When reading out the two-dimensional code elements K1 to K4 on the display unit 30b by, for example, the reading apparatus 10 shown in FIG. 9, the reading apparatus 10 sequentially reads out the switchably displayed two-dimensional code elements K1 to K4 and decodes them, respectively. Because the display order is set to the two-dimensional code elements K1 to K4, when the reading apparatus 10 has decoded the two-dimensional code elements K1 to K4, the reading apparatus 10 assembles the decoded values corresponding to the two-dimensional code elements K1 to K4 in accordance with the display order (division order). As a result, the reading apparatus 10 can obtain the data stored on the two-dimensional code 1.

As described above, in cases where the screen area of the display unit 30b is narrow or compact, it is possible to display the two-dimensional code 1 the size of which is larger than the screen area of the display unit 30b. In addition, the colored two-dimensional code 1 has large amount of information so that it is also possible to display the large amount of information on the narrow screen of the display unit 30b, thereby increasing the efficiency of displaying the large amount of information.

Incidentally, the present invention is not limited to the first to fourth embodiments, and various kind of modifications may be made within the scope of the present invention.

For example, in the first to fourth embodiments, the error correcting code and the error detection code are added to each block B, but at least one of the error correcting code and the error detection code may be added to each block B.

In addition, in the first to fourth embodiments, first to fifth data indicating colors are used to indicate the data values of the two-dimensional code, but other three different colors or more that can be optically read out may be used.

The pattern forms of the position detecting patterns are not limited to the forms disclosed in FIGS. 1A, and 2A to 2C, and other pattern forms, such as circular pattern forms may be applied to the position detecting patterns.

While there has been described what is at present considered to be these embodiments and modifications of the invention, it will be understood that various modifications which are not described yet may be made therein, and it is intended to cover in the appended claims all such modifications as fall within the true spirit and scope of the invention.

This application is based upon and claims the benefit of priority of the prior Japanese Patent Application 2003-021936 filed on Jan. 30, 2003 so that the contents of which are incorporated herein by reference.

What is claimed is:

1. A two-dimensional code comprising:
a plurality of unit cells arranged in two-dimension, each of said unit cells indicating one of at least three colors, each color of each of said unit cells being optically readable and representing a data value set to each of the unit cells; and
a specifying pattern portion including a plurality of color reference cells and configured to specify positions of the unit cells, said color reference cells indicating all of the at least three colors,
wherein said unit cells and color reference cells are arranged substantially in a matrix configuration, said plurality of color reference cells include first color reference cells, said specifying pattern portion includes a first specifying pattern that includes the first color reference cells, said first specifying pattern is disposed to one of peripheries of the matrix configuration, said at least three colors include a first color and a second color having a predetermined contrast level to be optically identifiable between each other, said first and second colors are individually assigned to the first color reference cells in accordance with a predetermined ratio between the first color and second color, and said predetermined ratio is optically readable independent of reading directions along the two-dimension.

2. A two-dimensional code according to claim 1, wherein said plurality of color reference cells include second color reference cells, third color reference cells, fourth color reference cells, and fifth color reference cells, said specifying pattern portion includes second, third, fourth, and fifth specifying patterns, at least one of said second, third, fourth, and fifth specifying patterns is disposed to other one of the peripheries of the matrix configuration, said at least three colors include third, forth, and fifth colors which are different from the first and second colors, said third color is assigned to at least one of the second color reference cells, said fourth color is assigned to at least one of the third color reference cells, and said fifth color is assigned to at least one of the fourth color reference cells.

3. A two-dimensional code according to claim 1, wherein said first color is white and said second color is black.

4. A two-dimensional code according to claim 2, wherein said third, fourth, and fifth colors are red, blue, and green, respectively.

5. A two-dimensional code according to claim 2, wherein said first color reference cells, second color reference cells, third color reference cells, fourth color reference cells, and fifth color reference cells are disposed to four corner portions and a center portion of the matrix configuration, respectively.

6. A two-dimensional information code comprising:
a plurality of blocks each including a plurality of unit cells, said plurality of blocks being arranged in two-dimension, each of said unit cells indicating one of at least three colors, said at least three colors being optically readable, a combination of said colors assigned to each block representing data; and
a specifying pattern portion including a plurality of color reference cells arranged among the plurality of blocks, said specifying pattern portion specifying positions of the unit cells of each of the blocks, said color reference cells indicating all of the at least three colors,
wherein said each color of each of said unit cells represents one bit data, said one bit data takes one of a plurality of data values, and a number of data values corresponds to that of the at least three colors.

7. A two-dimensional information code according to claim 6, wherein said data represented by the combination of colors of each of the blocks is shifted by a constant data value so that the colors of adjacent unit cells of each of the blocks are different from each other.

8. A two-dimensional information code according to claim 6, wherein said plurality of blocks include at least one data block representing the data, and at least one error correcting block including an error correcting code for correcting an error caused in the at least one data block.

9. A two-dimensional information code according to claim 6, wherein said data of each of the blocks includes a data item that corresponds to the combination of the colors assigned to each of the blocks, and an error detection code for detecting an error caused in the data item of each of the blocks.

10. A two-dimensional information code according to claim 9, wherein said data item and the error detection code represent a numerical value, and said combination of the colors assigned to each of the blocks represents the numerical value.

11. A generating apparatus for generating a two-dimensional code for representing data values, in which said two-dimensional code comprising a plurality of unit cells, said generating apparatus comprising:
a controller; and
a memory connected thereto and having a two-dimensional storage area, said controller being configured to:
assign one of at least three colors to each of the unit cells, each color of each of said unit cells being optically readable and representing each of the data values;
arrange the plurality of unit cells on the two-dimensional storage area in two-dimension; and
allocate a specifying pattern portion on the two-dimensional storage area at a position adjacent to the unit cells so as to generate the two-dimensional code on the two-dimensional storage area, said specifying pattern including a plurality of color reference cells and configured to specify positions of the unit cells, said color reference cells indicating all of the at least three colors.

12. A generating apparatus for generating a two-dimensional code for representing data, said two-dimensional code comprising a plurality of blocks each including a plurality of unit cells, said generating apparatus comprising:

a controller; and a memory connected thereto and having a two-dimensional storage area, said controller being configured to:

divide the data into a plurality of pieces of data, said pieces of data corresponding to the blocks, respectively;

compute a data value of each of the pieces of data;

assign one of at least three colors to each of the unit cells of each of the blocks, each color of each of said unit cells being optically readable, a combination of said colors assigned to each of the blocks representing each of the computed data values;

arrange the colored blocks on the two-dimensional storage area in two-dimension; and allocate a specifying pattern portion on the two-dimensional storage area at a position adjacent to the blocks so as to generate the two-dimensional code on the two-dimensional storage area, said specifying pattern including a plurality of color reference cells and configured to specify positions of the unit cells, said color reference cells indicating all of the at least three colors.

13. A generating apparatus according to claim 12, wherein said computing includes:

firstly computing error correcting codes according to the pieces of data, said pieces of data and error correcting codes constituting block data;

secondly computing an error detecting code according to each of the block data to add each error detecting code to each block data; and thirdly computing each data value corresponding to each block data according to each block data.

14. A generating apparatus according to claim 13, wherein said thirdly computing includes adding a constant value to each block data to generate the data value of each block data so that the colors assigned to adjacent unit cells of each of the blocks are different from each other.

15. A reading apparatus for reading a two-dimensional code, in which said two-dimensional code comprising:

a plurality of unit cells arranged in two-dimension, each of said unit cells indicating one of at least three colors, each color of each of said unit cells being optically readable and representing a data value set to each of the unit cells; and a specifying pattern portion including a plurality of color reference cells and configured to specify positions of the unit cells, said color reference cells indicating all of the at least three colors, said at least three colors having predetermined brightness levels to be optically identifiable thereamong, said reading apparatus comprising:

a reading unit configured to read out the two-dimensional code to generate at least three color image data corresponding to the at least three colors;

a generating unit configured to generate brightness image data according to the at least three color image data, said brightness image data comprising at least two gray levels, one of which is higher than other thereof;

a detecting unit configured to detect the specified pattern portion according to the at least two gray levels included in the generated brightness image data;

an identifying unit configured to identify the at least three colors according to the color reference cells of the specified pattern portion;

a specifying unit configured to specify each color assigned to each of the unit cells according to the colors of the color reference cells and the at least three color image data; and a decoding unit configured to decode the data value of each of the unit cells according to the specified color of each of the unit cells.

16. A reading apparatus according to claim 15, wherein said unit cells are partitioned into a plurality of blocks, said plurality of blocks include at least one data block representing data, and at least one error correcting block including an error correcting code for correcting an error caused in the at least one data block, said data of each of the blocks includes a data item that corresponds a combination of the colors assigned to the unit cells in each of the blocks, and an error detection code for detecting an error caused in the data item of each of the blocks, further comprising:

an error checking unit configured to check whether an error occurs in the at least one data block according to the error detection code included in the data of the at least one data block; and an error correcting unit configured to, when the error checking unit checks that the error occurs in the at least one data block, correct the error in the at least one data block according to the error correcting code in the at least one error correcting block.

17. A reading apparatus according to claim 15, wherein said identifying unit is configured to set at least three threshold brightness levels corresponding to the at least three colors, and said specifying unit is configured to determine whether brightness levels of the at least three color image data corresponding to each of the unit cells are higher than the set threshold brightness levels, respectively, and to specify each color assigned to each of the unit cells based on the result of the determination.

18. A displaying apparatus for displaying a two-dimensional code, in which said two-dimensional code comprising:

a plurality of unit cells arranged in two-dimension, each of said unit cells indicating one of at least three colors, each color of each of said unit cells being optically readable and representing a data value set to each of the unit cells, a set of all of the data values of the unit cells representing data; and a specifying pattern portion including a plurality of color reference cells and configured to specify positions of the unit cells, and said color reference cells indicating all of the at least three colors, said displaying apparatus comprising:

a dividing unit configured to divide the data into a number of pieces of data;

a converting unit configured to convert the pieces of data into a number of two-dimensional code elements in a predetermined order, said number of two-dimensional code elements corresponding to the number of the pieces of data; and a displaying unit configured to display switchably the two-dimensional code elements in the predetermined order.

19. A method of generating a two-dimensional code for representing data, said two-dimensional code comprising a plurality of blocks each including a plurality of unit cells, said method comprising:

dividing the data into a plurality of pieces of data, said pieces of data corresponding to the blocks, respectively;

computing a data value of each of the pieces of data;

assigning one of at least three colors to each of the unit cells of each of the blocks, each color of each of said unit cells being optically readable, a combination of said colors assigned to each of the blocks representing each of the computed data values;

arranging the colored blocks on a two-dimensional storage area in two-dimension; and allocating a specifying pattern portion on the two-dimensional storage area at a position adjacent to the blocks so as to generate the two-dimensional code on the two-dimensional storage area, said specifying pattern including a plurality of color reference cells and configured to specify positions of the unit cells, said color reference cells indicating all of the at least three colors.

20. A method of reading a two-dimensional code, in which said two-dimensional code comprising:

a plurality of unit cells arranged in two-dimension, each of said unit cells indicating one of at least three colors, each color of each of said unit cells being optically readable and representing a data value set to each of the unit cells; and a specifying pattern portion including a plurality of color reference cells and configured to specify positions of the unit cells, said color reference cells indicating all of the at least three colors, said at least three colors having predetermined contrast levels to be optically identifiable therearnong, said method comprising:

reading out the two-dimensional code to generate at least three color image data corresponding to the at least three colors;

generating brightness image data comprising according to the at least three color image data, said brightness image data comprising at least two gray levels, one of which is higher than other thereof;

detecting the specified pattern portion according to the at least two gray levels included in the generated brightness image data;

identifying the at least three colors according to the color reference cells of the specified pattern portion;

specifying each color assigned to each of the unit cells according to the colors of the color reference cells and the at least three color image data; and decoding the data value of each of the unit cells according to the specified color of each of the unit cells.

21. A method of displaying a two-dimensional code, in which said two-dimensional code comprising:

a plurality of unit cells arranged in two-dimension, each of said unit cells indicating one of at least three colors, each color of each of said unit cells being optically readable and representing a data value set to each of the unit cells, a set of all of the data values of the unit cells representing data; and a specifying pattern portion including a plurality of color reference cells and configured to specify positions of the unit cells, and said color reference cells indicating all of the at least three colors, said method comprising:

dividing the data into a number of pieces of data;

converting the pieces of data into a number of two-dimensional code elements in a predetermined order, said number of two-dimensional code elements corresponding to the number of the pieces of data; and displaying switchably the two-dimensional code elements in the predetermined order.

22. A computer readable program product for generate a two-dimensional code for representing data, said two-dimensional code comprising a plurality of blocks each including a plurality of unit cells, said program product configured to cause a computer to:

divide the data into a plurality of pieces of data, said pieces of data corresponding to the blocks, respectively;

compute a data value of each of the pieces of data;

assign one of at least three colors to each of the unit cells of each of the blocks, each color of each of said unit cells being optically readable, a combination of said colors assigned to each of the blocks representing each of the computed data values;

arrange the colored blocks on a two-dimensional storage area in two-dimension, said two-dimensional area being located in a memory, said computer being accessible to the memory; and allocate a specifying pattern portion on the two-dimensional-storage area at a position adjacent to the blocks so as to generate the two-dimensional code on the two-dimensional storage area, said specifying pattern including a plurality of color reference cells and configured to specify positions of the unit cells, said color reference cells indicating all of the at least three colors.

23. A computer readable program product for reading a two-dimention code, in which said two-dimensional code comprising:

a plurality of unit cells arranged in two-dimension, each of said unit cells indicating one of at least three colors, each color of each of said unit cells being optically readable and representing a data value set to each of the unit cells; and a specifying pattern portion including a plurality of color reference cells and configured to specify positions of the unit cells, said color reference cells indicating all of the at least three colors, said at least three colors having predetermined contrast levels to be optically identifiable thereamong, said program product configured to cause a computer to:

read out the two-dimensional code to generate at least three color image data corresponding to the at least three colors;

generate brightness image data according to the at least three color image data, said brightness image data comprising at least two gray levels, one of which is higher than other thereof;

detect the specified pattern portion according to the predetermined contrast level included in the generated brightness image data;

identify the at least three colors according to the color reference cells of the specified pattern portion;

specify each color assigned to each of the unit cells according to the colors of the color reference cells and the at least three color image data; and decode the data value of each of the unit cells according to the specified color of each of the unit cells.

24. A computer readable program product for displaying a two-dimensional code, in which said two-dimensional code comprising:

a plurality of unit cells arranged in two-dimension, each of said unit cells indicating one of at least three colors, each color of each of said unit cells being optically readable and representing a data value set to each of the unit cells, a set of all of the data values of the unit cells representing data; and a specifying pattern portion including a plurality of color reference cells and configured to specify positions of the unit cells, and said color reference cells indicating all of the at least three colors, said program product configured to cause a computer to:

divide the data into a number of pieces of data;

convert the pieces of data into a number of two-dimensional code elements in a predetermined order, said number of two-dimensional code elements corresponding to the number of the pieces of data; and display switchably the two-dimensional code elements in the predetermined order.

* * * * *